United States Patent
Smith et al.

(10) Patent No.: US 10,180,504 B2
(45) Date of Patent: *Jan. 15, 2019

(54) ADAPTIVE DETECTION SENSOR ARRAY AND METHOD OF PROVIDING AND USING THE SAME

(71) Applicants: Arizona Board of Regents, a body corporate of the State of Arizona, Acting for and on behalf of Arizona State University, Scottsdale, AZ (US); The United States of America as Represented by the Secretary of the Army, Washington, DC (US)

(72) Inventors: Joseph Smith, Tempe, AZ (US); Eric Forsythe, Rockville, MD (US); David Allee, Phoenix, AZ (US)

(73) Assignees: ARIZONA BOARD OF REGENTS ON BEHALF OF ARIZONA STATE UNIVERSITY, Scottsdale, AZ (US); THE UNITED STATES OF AMERICA AS REPRESENTED BY THE SECRETARY OF THE ARMY, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/147,440

(22) Filed: May 5, 2016

(65) Prior Publication Data
US 2016/0252632 A1    Sep. 1, 2016

Related U.S. Application Data

(63) Continuation of application No. PCT/US2014/063488, filed on Oct. 31, 2014, which
(Continued)

(51) Int. Cl.
*G01T 1/24* (2006.01)
*G01J 1/42* (2006.01)
(Continued)

(52) U.S. Cl.
CPC ............... *G01T 1/24* (2013.01); *G01J 1/08* (2013.01); *G01J 1/4228* (2013.01);
(Continued)

(58) Field of Classification Search
CPC ......... G01J 2001/083; G01J 2001/4233; G01J 2001/4242; G01J 1/08; G01J 1/4228;
(Continued)

(56) References Cited

U.S. PATENT DOCUMENTS 4,167,754 A * 9/1979 Nagumo ........... H01L 27/14831
                                                    257/E27.154
4,523,231 A    6/1985 Therrien
(Continued)

FOREIGN PATENT DOCUMENTS

WO    2009113010    9/2009

OTHER PUBLICATIONS

International Search Report and Written Opinion from related International Patent Application No. PCT/US2014/063488, dated Feb. 6, 2015.
(Continued)

*Primary Examiner* — John Lee
(74) *Attorney, Agent, or Firm* — Bryan Cave Leighton Paisner LLP

(57) ABSTRACT

Some embodiments include a system having a detection sensor array, which includes multiple detection sensors with each detection sensor having an enabled state and a disabled state, and having a control module configured to operate the detection sensor array. Under the enabled state, each detection sensor is configured to detect and identify electromag-
(Continued)

netic radiation, and under the disabled state, each detection sensor is configured not to detect and identify electromagnetic radiation. Further, the detection sensor array comprises a test state and an operational state. Other embodiments of related systems and methods are also disclosed.

20 Claims, 12 Drawing Sheets

Related U.S. Application Data is a continuation of application No. PCT/US2014/063496, filed on Oct. 31, 2014.

(60) Provisional application No. 61/900,062, filed on Nov. 5, 2013, provisional application No. 61/900,059, filed on Nov. 5, 2013.

(51) Int. Cl.
   *G01J 1/08* (2006.01)
   *H04N 5/345* (2011.01)
   *H04N 5/357* (2011.01)
   *H04N 17/00* (2006.01)

(52) U.S. Cl.
   CPC ........ *H04N 5/3454* (2013.01); *H04N 5/3572* (2013.01); *H04N 17/002* (2013.01)

(58) Field of Classification Search
   CPC ......... G01J 1/0228; G01J 1/02; H04N 5/345; H04N 5/3456; H04N 5/3454; H04N 5/341; H04N 5/3572; H04N 5/357; H04N 17/002; H04N 5/335; H04N 9/64; G01T 1/247; G01T 1/24; G01N 15/1425; G01N 33/563; G01N 15/14; G01N 33/49; G01N 33/50; G01N 21/64; G01N 33/53; G01R 29/08; H01L 29/66; H01L 27/146; H01L 21/50; B01L 3/00; H05B 37/02
   See application file for complete search history.

(56) References Cited

U.S. PATENT DOCUMENTS

| | | | | |
|---|---|---|---|---|
| 4,893,185 A * | 1/1990 | Fukushima | ............ | H04N 5/367 348/247 |
| 5,047,861 A * | 9/1991 | Houchin | ............. | H04N 5/3572 348/247 |
| 6,002,433 A * | 12/1999 | Watanabe | ............. | H04N 5/367 348/246 |
| 6,497,511 B1 * | 12/2002 | Schmitt | ................ | H04N 5/325 348/E5.081 |
| 6,593,961 B1 * | 7/2003 | Perino | .................. | G06T 7/0006 348/187 |
| 7,061,533 B1 * | 6/2006 | Urushiya | ............... | G01N 23/04 348/346 |
| 7,286,171 B2 * | 10/2007 | Kim | ..................... | H04N 5/2176 348/187 |
| 7,352,395 B2 * | 4/2008 | An | ........................ | H04N 5/367 348/247 |
| 7,511,748 B2 * | 3/2009 | Kagle | ................... | H04N 5/367 348/187 |
| 7,557,841 B2 * | 7/2009 | Hashimoto | ......... | H04N 5/3675 345/32 |
| 7,755,680 B2 * | 7/2010 | Watanabe | ............ | G06T 7/0002 348/247 |
| 7,783,103 B2 * | 8/2010 | Kuchii | ................. | G06T 7/0004 356/239.1 |
| 7,944,488 B2 * | 5/2011 | Post | .................... | H04N 5/2176 348/241 |
| 8,159,570 B2 * | 4/2012 | Negishi | ................ | H04N 5/367 348/247 |
| 9,525,865 B2 * | 12/2016 | Sagar | ................. | H04N 5/23222 |
| 9,903,959 B2 * | 2/2018 | Smith | ....................... | G01T 1/24 |
| 2002/0080253 A1 | 6/2002 | Kim | | |
| 2003/0007081 A1 * | 1/2003 | Kwon | ................... | H04N 5/367 348/247 |
| 2005/0104003 A1 | 5/2005 | Jarron | | |
| 2005/0200291 A1 | 9/2005 | Naugler, Jr. et al. | | |
| 2010/0221846 A1 | 9/2010 | Widdershoven | | |
| 2011/0062531 A1 | 3/2011 | De Langen et al. | | |
| 2012/0025717 A1 | 2/2012 | Klusmann et al. | | |
| 2012/0140223 A1 | 6/2012 | Mitchell et al. | | |
| 2012/0211660 A1 * | 8/2012 | Allee | ....................... | G01T 3/06 250/362 |
| 2013/0187027 A1 | 7/2013 | Qiao et al. | | |
| 2016/0245689 A1 * | 8/2016 | Smith | .................. | H04N 5/3454 |
| 2016/0252632 A1 * | 9/2016 | Smith | .................. | H04N 5/3454 250/370.09 |

OTHER PUBLICATIONS

International Search Report and Written Opinion from related International Patent Application No. PCT/US2014/063496, dated Jan. 27, 2015.
P. Goetz et al., "Practical Considerations of Retroreflector Choice in Modulating Retroreflector Systems," 2005 Digest of the LEOS Summer Topical Meetings (Jul. 25-27, 2005).
W.S. Rabinovich et al., "Performance of Cat's Eye Modulating Retro-Reflectors for Free-Space Optical Communications." Free-Space Laser Communications IV, Proceedings of SPIE vol. 5550, (Oct. 2004).

* cited by examiner

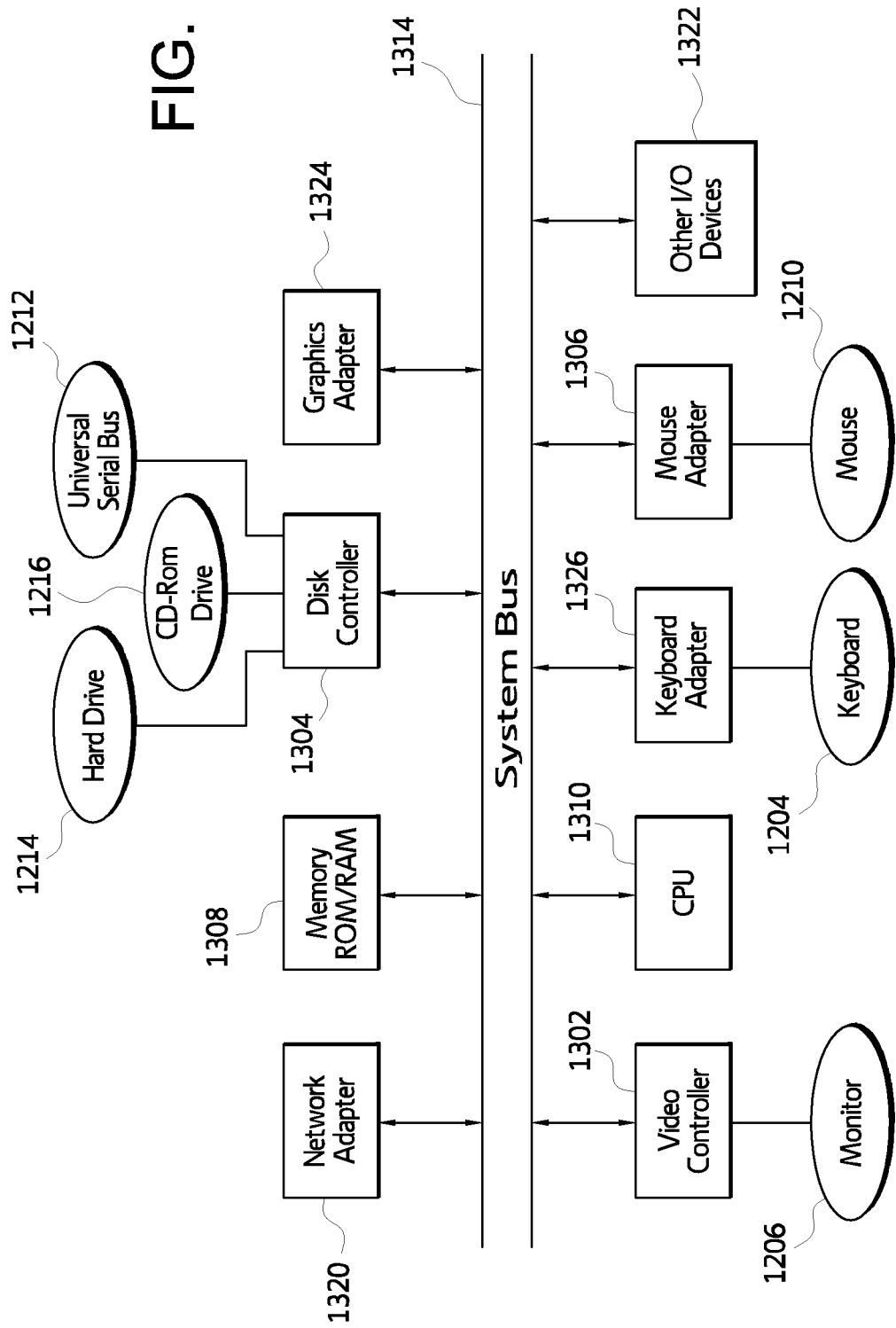

ADAPTIVE DETECTION SENSOR ARRAY AND METHOD OF PROVIDING AND USING THE SAME

CROSS-REFERENCE TO RELATED APPLICATIONS

This application is a continuation of International Patent Application No. PCT/US2014/063488, filed Oct. 31, 2014, and is a continuation of International Patent Application No. PCT/US2014/063496, filed Oct. 31, 2014. Meanwhile, International Patent Application No. PCT/US2014/063488 and International Patent Application No. PCT/US2014/063496 each claim the benefit of U.S. Provisional Application No. 61/900,059, filed Nov. 5, 2013, and U.S. Provisional Application No. 61/900,062, filed Nov. 5, 2013.

STATEMENT REGARDING FEDERALLY SPONSORED RESEARCH OR DEVELOPMENT

This invention was made with government support under W911NF-04-2-0005 awarded by the Army Research Office. The government has certain rights in the invention.

International Patent Application No. PCT/US2014/063488, International Patent Application No. PCT/US2014/063496, U.S. Provisional Application No. 61/900,059, and U.S. Provisional Application No. 61/900,062 are incorporated herein by reference in their entirety.

FIELD OF THE INVENTION

This invention relates generally to detection sensor arrays, and relates more particularly to adaptive detection sensor arrays and methods of providing and using the same.

DESCRIPTION OF THE BACKGROUND

Detection of particles (e.g., photons, etc.) can be fundamental to implementing numerous modern technologies including but not limited to communication technologies (e.g., free space optical communication), imaging technologies (e.g., medical, industrial, and/or security imaging), etc. In an effort to capture more particles for a particular particle detection application, conventional systems and/or methods of particle detection may implement multiple detection sensors in combination. However, implementing multiple detection sensors in combination can also contribute to increased system noise, and thus, decreased accuracy of detection of desired particles.

Accordingly, a need or potential for benefit exists for systems and methods of particle detection that can implement multiple detection sensors in combination with reduced system noise and increased accuracy of detection.

BRIEF DESCRIPTION OF THE DRAWINGS

To facilitate further description of the embodiments, the following drawings are provided in which:

FIG. 13 illustrates a representative block diagram of an example of the elements included in circuit board(s) inside a chassis of the computer of FIG. 12.

Figure 1:
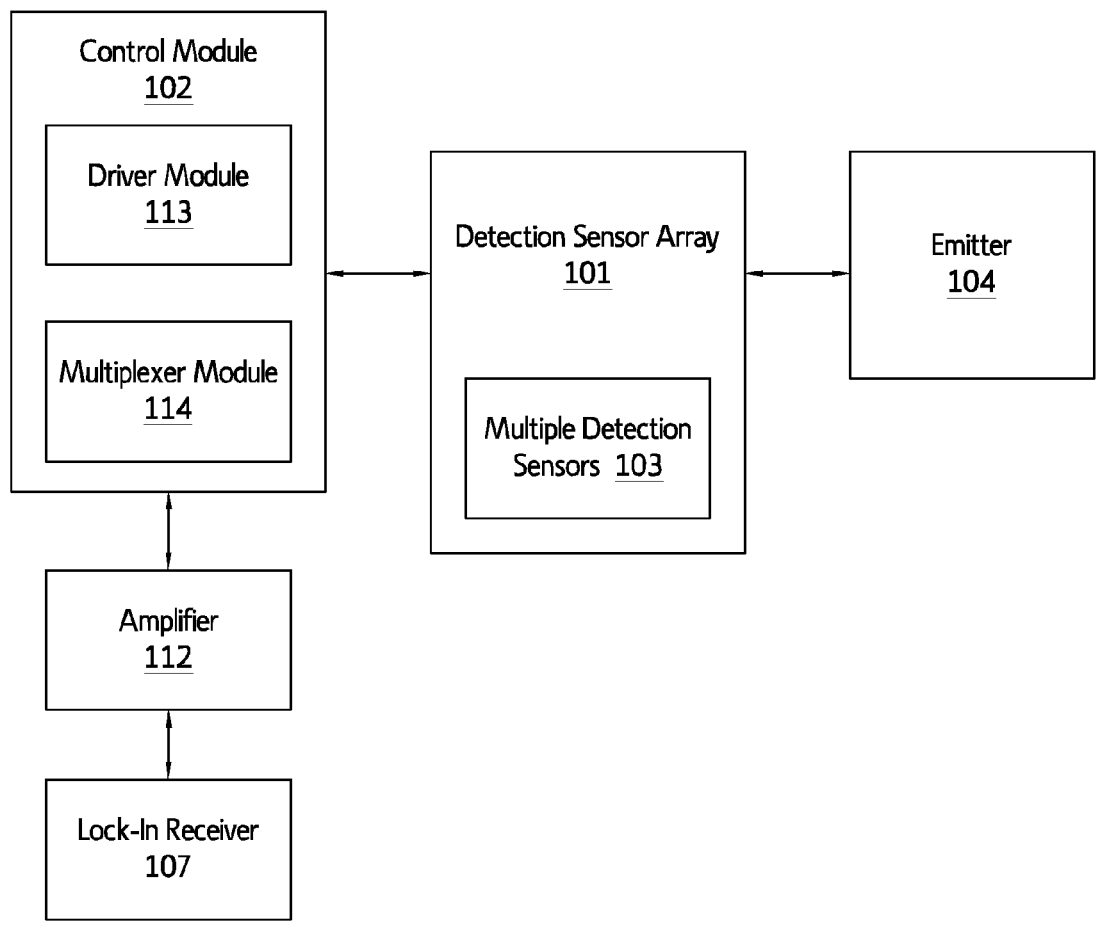
FIG. 1 illustrates a block diagram of a system, according to an embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

Some embodiments include a system. The system comprises a detection sensor array and a control module. The detection sensor array comprises multiple detection sensors, and each detection sensor of the multiple detection sensors comprises an enabled state and a disabled state. Meanwhile, the control module is configured to operate the detection sensor array. Under the enabled state, each detection sensor of the multiple detection sensors can be configured to detect and identify electromagnetic radiation; and under the disabled state, each detection sensor of the multiple detection sensors can be configured not to detect and identify electromagnetic radiation. Further, the detection sensor array can comprise a test state and an operational state. When the detection sensor array is in the test state, the detection sensor array can be configured such that all of the multiple detection sensors operate in the enabled state and the control module is configured to determine for each detection sensor of the multiple detection sensors: (a) whether such detection sensor is a detecting detection sensor that detects at least a predetermined amount of electromagnetic radiation or (b) whether such detection sensor is a non-detecting detection sensor that detects less than the predetermined amount of electromagnetic radiation; and when the detection sensor array is in the operational state, the detection sensor array can be configured such that detecting detection sensors of the multiple detection sensors operate in the enabled state and non-detecting detection sensors of the multiple detection sensors operate in the disabled state.

Other embodiments include a method of providing a system. The method can comprise: providing a detection sensor array comprising multiple detection sensors; providing a control module; configuring each detection sensor of the multiple detection sensors to comprise an enabled state and a disabled state; and configuring the detection sensor array to comprise a test state and an operational state. Under the enabled state, each detection sensor of the multiple detection sensors can be configured to detect and identify electromagnetic radiation; and under the disabled state, each detection sensor of the multiple detection sensors can be configured not to detect and identify electromagnetic radiation. When the detection sensor array is in the test state, the detection sensor array can be configured such that all of the multiple detection sensors operate in the enabled state and the control module is configured to determine for each detection sensor of the multiple detection sensors: (a) whether such detection sensor is a detecting detection sensor that detects at least a predetermined amount of electromagnetic radiation or (b) whether such detection sensor is a non-detecting detection sensor that detects less than the predetermined amount of electromagnetic radiation; and when the detection sensor array is in the operational state, the detection sensor array can be configured such that detecting detection sensors of the multiple detection sensors operate in the enabled state and non-detecting detection sensors of the multiple detection sensors operate in the disabled state.

Further embodiments include a system. The system comprises a detection sensor array and a control module. The detection sensor array comprises multiple detection sensors, and each detection sensor of the multiple detection sensors comprises an enabled state and a disabled state. Meanwhile, the control module is configured to operate the detection sensor array. Under the enabled state, each detection sensor of the multiple detection sensors can be configured to detect and identify electromagnetic radiation; and under the disabled state, each detection sensor of the multiple detection sensors can be configured not to detect and identify electromagnetic radiation. Further, the detection sensor array can comprise a test state and an operational state. When the detection sensor array is in the test state, the detection sensor array can be configured such that all of the multiple detection sensors operate in the enabled state and the control module is configured to determine for each detection sensor of the multiple detection sensors: (a) whether such detection sensor is a detecting detection sensor that detects modulated electromagnetic radiation or (b) whether such detection sensor is a non-detecting detection sensor that does not detect modulated electromagnetic radiation; and when the detection sensor array is in the operational state, the detection sensor array can be configured such that detecting detection sensors of the multiple detection sensors operate in the enabled state and non-detecting detection sensors of the multiple detection sensors operate in the disabled state.

Some embodiments include a method of operating a detection sensor array. The detection sensor array comprises multiple detection sensors, and each detection sensor of the multiple detection sensors comprises an enabled state and a disabled state. Each detection sensor of the multiple detection sensors is configured to detect and identify electromagnetic radiation when in the enabled state and not to detect and identify electromagnetic radiation when in the disabled state. Meanwhile, the detection sensor array further comprises a test state in which all of the multiple detection sensors operate in the enabled state when the detection sensor array is in the test state. The method can comprise: operating the detection sensor array in the test state; while operating the detection sensor array in the test state, receiving electromagnetic radiation at the detection sensor array; while or after receiving electromagnetic radiation at the detection sensor array, determining for each detection sensor of the multiple detection sensors: (a) whether such detection sensor is a first detecting detection sensor that detects at least a predetermined amount of electromagnetic radiation or (b) whether such detection sensor is a first non-detecting detection sensor that detects less than the predetermined amount of electromagnetic radiation; and after determining for each detection sensor of the multiple detection sensors: (a) whether such detection sensor is the first detecting detection sensor that detects at least the predetermined amount of electromagnetic radiation or (b) whether such detection sensor is the first non-detecting detection sensor that detects less than the predetermined amount of electromagnetic radiation, operating the detection sensor array in an operational state in which detecting detection sensors of the multiple detection sensors operate in the enabled state and non-detecting detection sensors of the multiple detection sensors operate in the disabled state, the first detecting detection sensors comprising the detecting detection sensors and the first non-detecting detection sensors comprising the non-detecting detection sensors.

Other embodiments include a method of operating a detection sensor array. The detection sensor array comprises multiple detection sensors, and each detection sensor of the multiple detection sensors comprises an enabled state and a disabled state. Each detection sensor of the multiple detection sensors is configured to detect and identify electromagnetic radiation when in the enabled state and not to detect and identify electromagnetic radiation when in the disabled state. Meanwhile, the detection sensor array further comprises a test state in which all of the multiple detection sensors operate in the enabled state when the detection sensor array is in the test state. The method can comprise: operating the detection sensor array in the test state; while operating the detection sensor array in the test state, receiving electromagnetic radiation at the detection sensor array; while or after receiving electromagnetic radiation at the detection sensor array, determining for each detection sensor of the multiple detection sensors: (a) whether such detection sensor is a first detecting detection sensor that detects modulated electromagnetic radiation or (b) whether such detection sensor is a first non-detecting detection sensor that does not detect modulated electromagnetic radiation; and after determining for each detection sensor of the multiple detection sensors: (a) whether such detection sensor is the first detecting detection sensor that detects modulated electromagnetic radiation or (b) whether such detection sensor is the first non-detecting detection sensor that does not detect modulated electromagnetic radiation, operating the detection sensor array in an operational state in which detecting detection sensors of the multiple detection sensors operate in the enabled state and non-detecting detection sensors of the multiple detection sensors operate in the disabled state, the first detecting detection sensors comprising the detecting detection sensors and the first non-detecting detection sensors comprising the non-detecting detection sensors.

Further embodiments include a method of operating a detection sensor array. The detection sensor array comprises multiple detection sensors. Each detection sensor of the multiple detection sensors comprises an enabled state and a disabled state, and each detection sensor of the multiple detection sensors is configured to detect and identify electromagnetic radiation when in the enabled state and not to detect and identify electromagnetic radiation when in the disabled state. Meanwhile, the detection sensor array comprises a first detection sensor sheet comprising first sheet detection sensors and a second detection sensor sheet comprising second sheet detection sensors. The multiple detection sensors comprise the first sheet detection sensors and the second sheet detection sensors. Further, the detection sensor array comprises a first test state in which all of the first sheet detection sensors operate in the enabled state when the detection sensor array is in the first test state, and a second test state in which all of the second sheet detection sensors operate in the enabled state when the detection sensor array is in the second test state. The method can comprise: operating the detection sensor array in the first test state and the second test state; while operating the detection sensor array in the first test state and the second test state, receiving electromagnetic radiation at the detection sensor array; while or after receiving electromagnetic radiation at the detection sensor array, determining for each detection sensor of the first sheet detection sensors: (a) whether such detection sensor is a first detecting detection sensor that detects at least a predetermined amount of electromagnetic radiation or (b) whether such detection sensor is a first non-detecting detection sensor that detects less than the predetermined amount of electromagnetic radiation; while or after receiving electromagnetic radiation at the detection sensor array, determining for each detection sensor of the second sheet detection sensors: (a) whether such detection sensor is a second detecting detection sensor that detects at least the predetermined amount of electromagnetic radiation or (b) whether such detection sensor is a second non-detecting detection sensor that detects less than the predetermined amount of electromagnetic radiation; after determining for each detection sensor of the first sheet detection sensors: (a) whether such detection sensor is the first detecting detection sensor that detects at least the predetermined amount of electromagnetic radiation or (b) whether such detection sensor is the first non-detecting detection sensor that detects less than the predetermined amount of electromagnetic radiation, operating the detection sensor array in a first operational state in which detecting detection sensors of the first sheet detection sensors operate in the enabled state and non-detecting detection sensors of the first sheet detection sensors operate in the disabled state, the first detecting detection sensors comprising the detecting detection sensors of the first sheet detection sensors and the first non-detecting detection sensors comprising the non-detecting detection sensors of the first sheet detection sensors; and after determining for each detection sensor of the second sheet detection sensors: (a) whether such detection sensor is the second detecting detection sensor that detects at least the predetermined amount of electromagnetic radiation or (b) whether such detection sensor is the second non-detecting detection sensor that detects less than the predetermined amount of electromagnetic radiation, operating the detection sensor array in a second operational state in which detecting detection sensors of the second sheet detection sensors operate in the enabled state and non-detecting detection sensors of the second sheet detecting sensors operate in the disabled state, the second detecting detection sensors comprising the detecting detection sensors of the second sheet detection sensors and the second non-detecting detection sensors comprising the non-detecting detection sensors of the second sheet detection sensors.

Turning to the drawings, FIG. 1 illustrates a block diagram of system 100, according to an embodiment. System 100 is merely exemplary and is not limited to the embodiments presented herein. System 100 can be employed in many different embodiments or examples not specifically depicted or described herein.

In many embodiments, system 100 can be implemented for any suitable application employing particle detection. In some specific examples, system 100 can be implemented as a communication system, such as, for example, a free space optical (FSO) communication system. In other specific examples, system 100 can be implemented as an imaging system for digitally imaging (e.g., x-ray imaging) one or more objects (e.g., one or more persons, one or more body parts and/or organs of the person(s), one or more articles of luggage, etc.), such as, for example, for medical, industrial, and/or security imaging.

Regardless of the manner of implementation, system 100 comprises detection sensor array (DSA) 101 and control module 102. Further, system 100 can comprise emitter 104, amplifier 112, and/or lock-in receiver 107, and in some embodiments, control module 102 can comprise driver module 113 and/or multiplexer module 114. In some embodiments, such as, for example, when DSA 101 is not receiving modulated electromagnetic radiation, lock-in receiver 107 can be omitted. In further embodiments, amplifier 112 can be omitted.

It may be impractical to implement DSA 101 with a single pixel due to the increasing likelihood in occurrence of manufacturing defects as the size of DSA 101 increases and/or due to the relationship of optical detection sensitivity to signal to noise ratio (SNR) of DSA 101. Regarding the increasing likelihood of manufacturing defects, even a single defect (e.g., an anode to cathode short at DSA 101 etc.) could render all of DSA 101 inoperable in a single pixel architecture. Meanwhile, regarding the relationship of optical detection sensitivity to SNR, in a single pixel architecture, the SNR of DSA 101 would be in direct proportion to the detecting versus non-detecting portions of DSA 101. As a result, as the non-detecting portions of DSA 101 increase, the noise at DSA 101 would also increase while the detecting portions of DSA 101 and resulting signal at DSA 101 would decrease and so too would the optical detection sensitivity of DSA 101. Accordingly, DSA 101 comprises multiple detection sensors 103. Implementing DSA 101 with multiple detection sensors 103 can mitigate manufacturing defects (e.g., by rendering only certain detection sensors of multiple detection sensors 103 inoperable when manufacturing defects occur) and/or can increase optical detection sensitivity, particularly when DSA 101 also is operated adaptively.

Specifically, in view of DSA 101 comprising multiple detection sensors 103, DSA 101 operates in system 100 as an adaptive detection sensor array. The adaptability of DSA 101 and/or the other functionality of system 100 causes system 100 to provide substantial advantages (e.g., increased optical detection sensitivity) over conventional systems employing particle detection. Exemplary advantages of system 100 are discussed in greater detail below in conjunction with the structural and operational details of system 100.

Multiple detection sensors 103 comprise multiple semiconductor detectors, and, in many embodiments, can be configured to detect and identify particles, such as, for example, photons (e.g., electromagnetic radiation). Accordingly, in many embodiments, multiple detection sensors 103 each can comprise a multiple flat panel image detector, and the multiple flat panel image detector can comprise a pixel of DSA 101. The pixel can comprise a photodiode and a transistor electrically coupled to the photodiode. In these embodiments, the transistor and the photodiode can be part of and/or provide a passive pixel. This type of pixel architecture is referred to as being passive because the TFT functions only as an on/off switch and provides no in-pixel amplification of detected particles. However, in other embodiments, the pixel can be implemented as any other suitable pixel circuit. For example, the pixel can further comprise in-pixel amplification, in which case the pixel can comprise an active pixel. For reference purposes, when multiple detection sensors 103 comprise passive pixels, DSA 101 can be referred to as a passive ISA, and when multiple detection sensors 103 comprise active pixels, DSA 101 can be referred to as an active ISA.

Further, the photodiode can comprise an inorganic photodiode, such as, for example, an amorphous silicon (a-Si) PIN photodiode. In these embodiments, DSA 101 can comprise an a-Si photodiode array. In other embodiments, the photodiode can comprise an organic photodiode.

Further still, the transistor can comprise a thin film transistor (TFT). In some embodiments, the TFT can comprise an active matrix TFT. In other embodiments, the TFT can comprise an n-enhancement mode TFT. Additional material and manufacturing details of DSA 101 and/or multiple detection sensors 103 are discussed in greater detail below with respect to FIG. 6.

Figure 2:
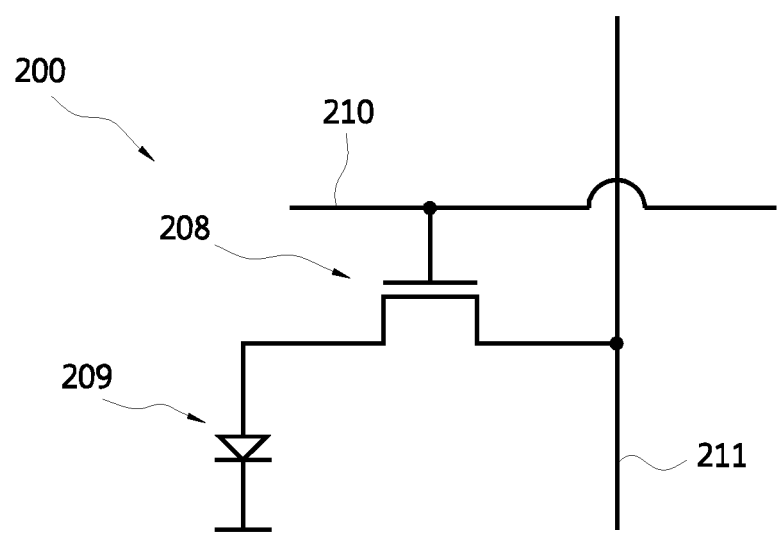
FIG. 2 illustrates an exemplary detection sensor, according to the embodiment of FIG. 1.

Meanwhile, turning to the next drawing, FIG. 2 illustrates an exemplary detection sensor 200, according to the embodiment of FIG. 1. Specifically, multiple detection sensors 103 each can be similar or identical detection sensor 200, and vice versa. Detection sensor 200 comprises thin film transistor 208 and photodiode 209 where thin film transistor 208 is coupled with photodiode 209, scan line 210, and data line 211. Scan line 210 can be similar or identical to one of the scan line(s) coupling control module 102 (FIG. 1) to DSA 101 (FIG. 1), as discussed below. Further, data line 211 can be similar or identical to one of the data line(s) coupling control module 102 (FIG. 1) to DSA 101 (FIG. 1), as also discussed below.

Referring now back to FIG. 1, multiple detection sensors 103 each can comprise an enabled state and a disabled state. When a detection sensor of multiple detection sensor(s) 103 is in the enabled state, the detection sensor is enabled (e.g., able to detect and identify electromagnetic radiation), and when the detection sensor is in the disabled state, the detection sensor is disabled (e.g., unable to detect and/or identify electromagnetic radiation). Stated more plainly, each detection sensor can be individually turned on or off, as desired. The on/off functionality of multiple detection sensor(s) 103 and the corresponding advantages of the on/off functionality are discussed in greater detail below. Nonetheless, for purposes of clarity, though the on/off functionality referred to above with respect to the TFT of each detection sensor of multiple detection sensors 103 can play a role in setting a detection sensor of multiple detection sensors 103 in the enabled or disabled state (e.g., via scan line assertion as described below), in many examples, the on/off functionality of the TFT is not absolutely determinative of whether the detection sensor is enabled or disabled. Rather, as explained more thoroughly in context below, whether each detection sensor of multiple detection sensors 103 operates in the enabled or disabled state is dictated by control module 102. Specifically, for a particular detection sensor of multiple detection sensors 103, a corresponding TFT of the detection sensor can be closed (i.e., on) though the detection sensor is in the disabled state, such as, for example, as a result of a scan line asserting the TFT of the detection sensor while multiplexer module 114 is decoupled from the particular detection sensor. Accordingly, when referring to whether a detection sensor is able or unable to detect and identify electromagnetic radiation for purposes of distinguishing the enabled and disabled states of the detection sensor, what is really meant is whether or not the detection sensor can both detect and then indicate detection of the electromagnetic radiation. To drive this point home, in the disabled state, a detection sensor of multiple detection sensors 103 may technically detect electromagnetic radiation but be unable to communicate an indication of such detection, such as, for example, by being isolated by multiplexer module 114, amplifier 112, and/or lock-in receiver 107.

Meanwhile, DSA 101 can comprise a test state and an operational state. When DSA 101 is in the test state, all of the multiple detection sensors operate in the enabled state, and when DSA 101 is in the operational state, detecting detection sensors operate in the enabled state and non-detecting detection sensors operate in the disabled state. The distinction between the classifications of detecting detection sensors and non-detecting detection sensors is explained below in context with control module 102.

Control module 102 is configured to operate DSA 101. Accordingly, control module 102 can be coupled (e.g., selectively) to DSA 101. In many embodiments, control module 102 can be coupled to DSA 101 via one or more scan (i.e., row) lines and one or more data (i.e., column) lines. More specifically, multiple detection sensors 103 each can be coupled to control module 102 by one scan line of the scan line(s) and one data line of the data line(s). In these or other embodiments, multiple detection sensors 103 each can be coupled to driver module 113 of control module 102 by the one scan line and can be coupled (e.g., selectively) to multiplexer module 114 of control module 102 by the one data line. In various embodiments, two or more detection sensors of multiple detection sensors 103 can be coupled to the same scan line of the scan lines, and/or two or more detection sensors of multiple detection sensors 103 can be coupled to the same data line of the data lines.

Control module 102 can control when DSA 101 operates in the test state and the operational state. Likewise, control module 102 can control when each detection sensor of multiple detection sensors 103 operates in the enabled state and the disabled state.

As a general matter, control module 102 operates DSA 101 first in the test state and then in the operational state (e.g., operating DSA 101 in the operational state can be dependent on the outcome of operating DSA 101 in the test state). Further, control module 102 can operate DSA 101 in the test state and then in the operational state within a continuous loop. The loops can be repeated at intervals and can be triggered and/or halted by control module 102 upon the occurrence of one or more events. Exemplary halting events can comprise the completion of a predetermined number of loop iterations, the receipt of a user command, etc. However, in specific embodiments, exemplary events also can be tied to the manner in which system 100 is implemented. For example, when system 100 is implemented as a communication system, a halting event can be the completed receipt of a communication transmission.

The frequency with which the loops occur can be determined by the operator and/or the manufacturer in order to suit a particular application. Accordingly, loop frequency can be dependent on the particular application for which system 100 is used.

Meanwhile, for each loop, the duration of time for which control module operates DSA 101 in the test state can be smaller than the duration of time in which control module operates DSA 101 in the operational state. However, the duration of time of the test state and the operational state for each loop also can be determined by the operator and/or the manufacturer to suit the particular application. Accordingly, the duration of time of the test state and operational state also can be dependent on the particular application for which system 100 is used.

When control module 102 operates DSA 101 in the test state, control module 102 can determine for each detection sensor of multiple detection sensors 103: (a) whether such detection sensor is a detecting detection sensor or (b) whether such detection sensor is a non-detecting detection sensor. In some embodiments, a detecting detection sensor can refer to a detection sensor that receives at least a predetermined amount of electromagnetic radiation, and a non-detecting detection sensor can refer to a detection sensor that receives less than the predetermined amount of electromagnetic radiation. In many examples, the predetermined amount of electromagnetic radiation can comprise approximately any electromagnetic radiation (i.e., such that the non-detecting detection sensor receives approximately no electromagnetic radiation). However, in other examples, the predetermined amount of electromagnetic radiation can comprise any other suitable amount of electromagnetic radiation. Meanwhile, in further embodiments, a detecting detection sensor can refer to a detection sensor that meets one or more suitable criteria, and a non-detecting detection sensor can refer to a detection sensor that fails to meet the one or more suitable criteria. Exemplary criteria can comprise the detection of modulated electromagnetic radiation, etc. Furthermore, the predetermined amount of electromagnetic radiation and/or the suitable criteria can be the same or different between each loop when DSA 101 is operated in a loop.

In many embodiments, control module 102 can determine for each detection sensor of multiple detection sensors 103: (a) whether such detection sensor is a detecting detection sensor or (b) whether such detection sensor is a non-detecting detection sensor by implementing a signal processing algorithm. For example, the signal processing algorithm can sample each detection sensor of multiple detection sensors 103. The signal processing algorithm can comprise any suitable signal processing algorithm configured to determine for each detection sensor of multiple detection sensors 103: (a) whether such detection sensor is a detecting detection sensor or (b) whether such detection sensor is a non-detecting detection sensor Upon determining for each detection sensor of multiple detection sensors 103: (a) whether such detection sensor is the detecting detection sensor or (b) whether such detection sensor is the non-detecting detection sensor, control module 102 can place the detecting detection sensors in the enabled state and the non-detecting detection sensors in the disabled state, thereby placing DSA 101 in the operational state. In effect, control module 102 adapts DSA 101 to disable currently non-detecting detection sensors while enabling currently detecting detection sensors. As a result, particle detection at the detecting detection sensors can be isolated from noise generated by the non-detecting detection sensors, thereby increasing the SNR and the optical detection sensitivity of DSA 101. Meanwhile, DSA 101 can be further adaptive as control module repeats operating DSA 101 in the test state and then again in the operational state as the detecting and non-detecting detection sensors may be subject to change. For example, the detecting detection sensors during one iteration of the test state may be different during another iteration of the test state. As a result, changes in the detecting and non-detecting detection sensors can be reflected over time for the operational state.

In some embodiments, control module 102 can control DSA 101 through operation of driver module 113 and multiplexer module 114. More specifically, control module 102 can control DSA 101 through coordination of driver module 113 and multiplexer module 114.

In many embodiments, driver module 113 can comprise one or more gate drivers. Each gate driver of the gate driver(s) can be coupled to one or more scan lines of the scan line(s) coupling DSA 101 to driver module 113. The gate driver(s) each can comprise any suitable gate driver for driving a DSA. In operation, driver module 113 can selectively assert the scan line(s) coupling DSA 101 to driver module 113 to selectively assert multiple detection sensors 103 (i.e., by closing the TFTs of multiple detection sensors 103). In many embodiments, selective assertion of the scan line(s) can be accomplished using a decoder.

Further, multiplexer module 114 can comprise one or more multiplexers (e.g., one or more analog multiplexers). Each multiplexer of the multiplexer(s) can be coupled (e.g., selectively) to one or more data lines of the data line(s) coupling (e.g., selectively) DSA 101 to multiplexer module 114. The multiplexer(s) each can comprise any suitable multiplexer for selectively coupling DSA 101 to multiplexer module 114 via the data line(s). In various embodiments, multiplexer module 114 can comprise one or more switches each being configured to selectively couple a data line of the data line(s) to multiplexer module 114. In operation, multiplexer module 114 can selectively open or close the switch(es), as desired, to couple or decouple one or more detection sensors of multiple detection sensors 103 from multiplexer module 114.

Accordingly, coordination of when the gate driver(s) of driver module 113 assert the scan line(s) coupling DSA 101 to drive module 113 and when the multiplexer(s) of multiplexer module 114 selectively couple DSA 101 and multiplexer module 114 via the various driver line(s) can permit control module 102 to enable and disable each detection sensor of multiple detection sensors 103 for the test state and the operational state of DSA 101, as applicable.

Meanwhile, multiplexer module 114 can be coupled to amplifier 112, and amplifier 112 can be coupled to lock-in receiver 107. Amplifier 112 can comprise any suitable amplifier (e.g., a low noise transimpedance amplifier), and lock-in receiver 107 can comprise any suitable lock-in receiver. Lock-in receiver 107 offers the ability to extract an extremely low level optically modulated signal from a noisy background using embedded modulation at a known reference frequency, where noise signals at frequencies other than the known reference frequency are rejected. Lock-in receiver 107 can be configured to maximize incident optical signal detection sensitivity, especially in optical free-space communications environments with high levels of ambient (light) related noise.

Further, emitter 104 can comprise any suitable emitter. However, in specific examples, emitter 104 can be configured to emit modulated electromagnetic radiation (e.g., when system 100 is a communication system) and/or x-ray electromagnetic radiation (e.g., when system 100 is an imaging system) at DSA 101.

Figure 3:
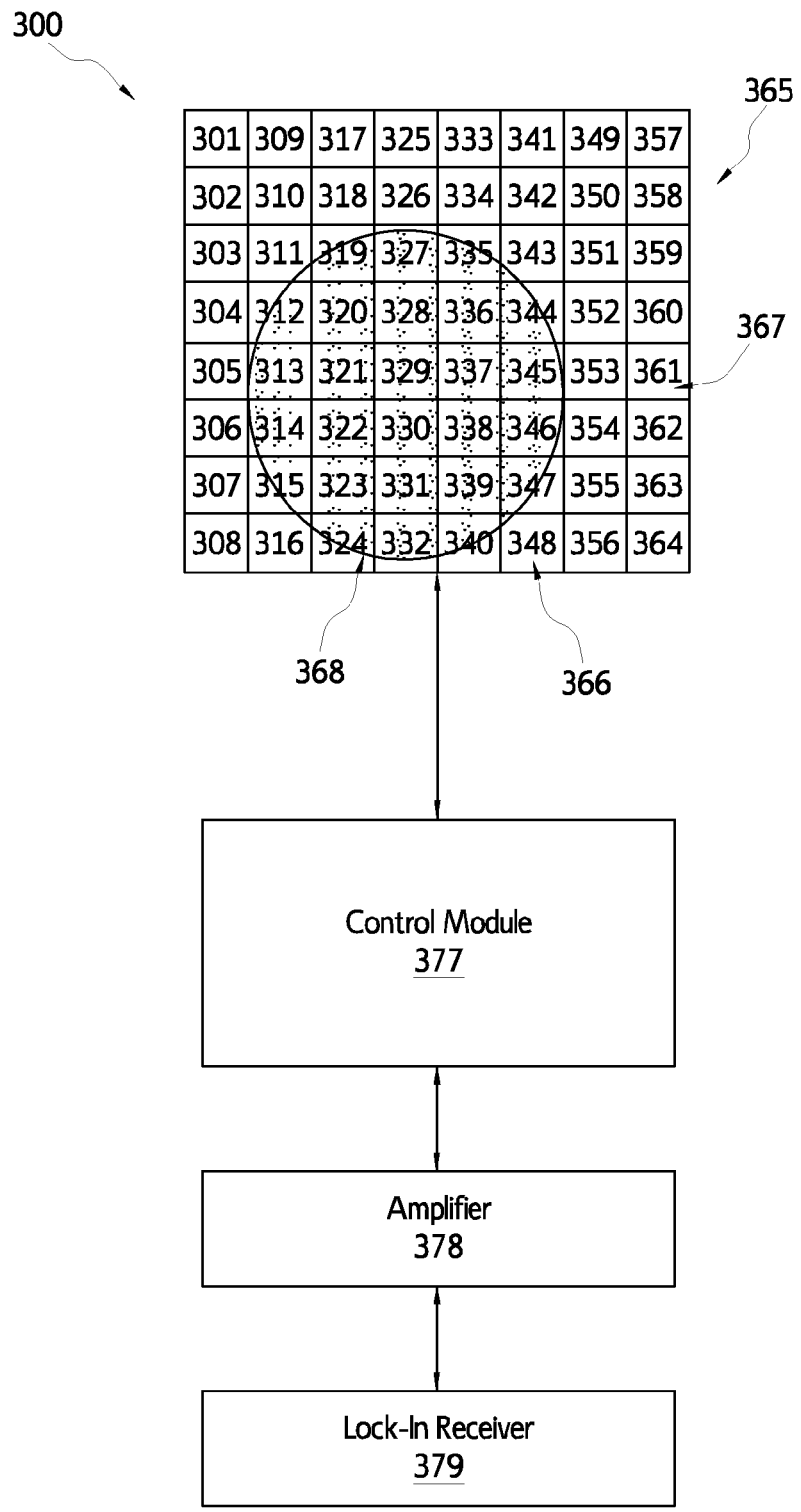
FIG. 3 illustrates an exemplary block diagram of a detection sensor array in an operational state for a particular loop, according to the embodiment of FIG. 1.
Figure 4:
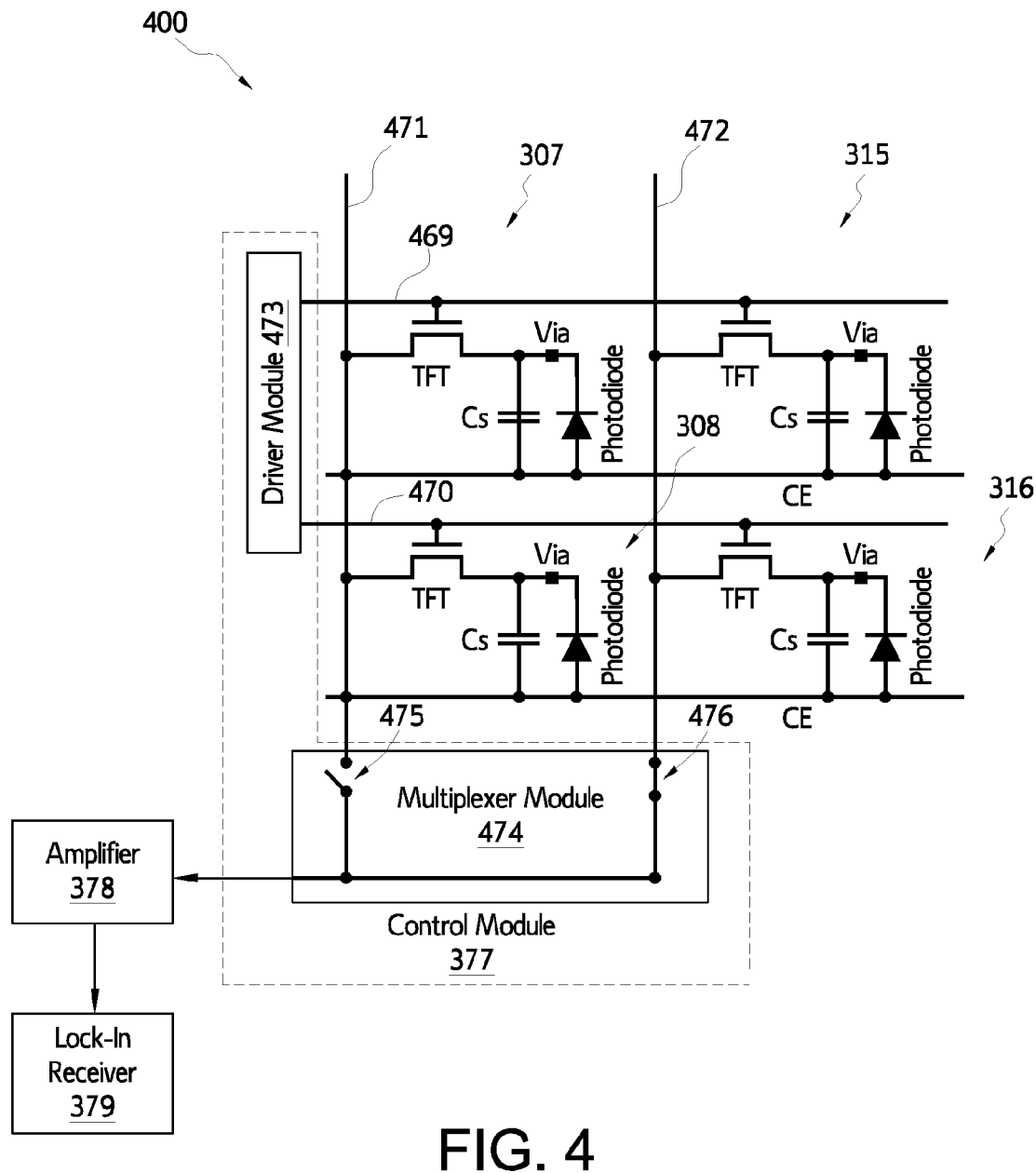
FIG. 4 illustrates an exemplary circuit diagram of four detection sensors of the detection sensor array of FIG. 3, according to the embodiment of FIG. 1.
Figure 5:
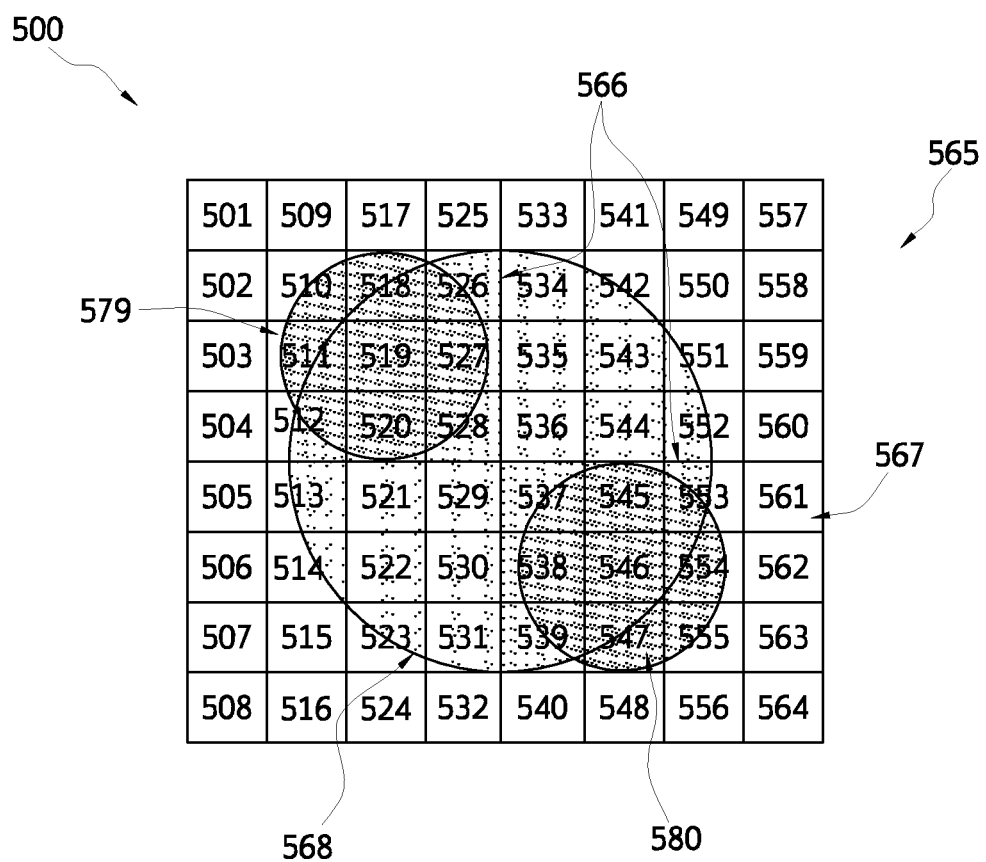
FIG. 5 illustrates an exemplary block diagram of another detection sensor array in an operational state for a particular loop, according to the embodiment of FIG. 1.

Turning ahead in the drawings, FIGS. 3-5 help to illustrate the adaptability and operability of DSA 101 of system 100. Specifically, FIG. 3 illustrates an exemplary block diagram of DSA 300 in an operational state for a particular loop, according to the embodiment of FIG. 1. DSA 300 can be similar or identical to DSA 101 (FIG. 1), and vice versa, and the operational state for DSA 300 can be similar or identical to the operational state described above with respect to DSA 101 (FIG. 1), and vice versa. DSA 300 comprises detection sensors 301 through 364. Multiple detection sensors 365 can be similar or identical to multiple detection sensors 103 (FIG. 1). Multiple detection sensors 365 can comprise detection sensors 301-364. Further, detection sensors 311-316, 319-324, 327-332, 335-340, and 343-348 are shown as detecting detection sensors 366 of multiple detection sensors 365, and detection sensors 301-310, 317, 318, 325, 326, 333, 334, 341, 342, and 349-364 are shown as non-detecting detection sensors 367 of multiple detection sensors 365. Detecting detection sensors 366 can be similar or identical to the detecting detection sensors described above with respect to system 100 (FIG. 1), and non-detecting detection sensors 367 can be similar or identical to the non-detecting detection sensors described above with respect to system 100 (FIG. 1). Accordingly, as illustrated at FIG. 3, detecting detection sensors 366 are currently receiving electromagnetic radiation in the form of electric beam 368. In many embodiments, electric beam 368 can be emitted by an emitter. The emitter can be similar or identical to emitter 104 (FIG. 1). Further, DSA 300 can be coupled to control module 377, amplifier 378, and lock-in receiver 379. Control module 377 can be similar or identical to control module 102 (FIG. 1); amplifier 378 can be similar or identical to amplifier 112 (FIG. 1); and/or lock-in receiver 379 can be similar or identical to lock-in receiver 107 (FIG. 1).

Meanwhile, FIG. 4 illustrates an exemplary circuit diagram 400 of detection sensors 307, 308, 315, and 316 of DSA 300, according to the embodiment of FIG. 3. Circuit diagram 400 comprises scan lines 469 and 470 and data lines 471 and 472. Detection sensors 307 and 315 can be coupled to scan line 469, and detection sensors 308 and 316 can be coupled to scan line 470. Further, detection sensors 307 and 308 can be coupled to data line 471, and detection sensors 315 and 316 can be coupled to data line 472. Scan lines 469 and 470 can be coupled to driver module 473 of control module 377, and data lines 471 and 472 can be coupled (e.g., selectively) to multiplexer module 474 of control module 377. Moreover, data line 471 can be coupled (e.g., selectively) to multiplexer module 474 by switch 475 of multiplexer module 474 and data line 472 can be coupled (e.g., selectively) to multiplexer module 474 by switch 476 of multiplexer module 474. Driver module 473 can be similar or identical to driver module 113 (FIG. 1), and multiplexer module 474 can be similar or identical to multiplexer module 114 (FIG. 1).

Meanwhile, when multiplexer module 474 is coupled to data line 471 and/or data line 472, multiplexer module 474 can couple detection sensors 307 and 308 (e.g., via data line 471) and/or detection sensors 315 and 316 (e.g., via data line 472) to amplifier 378 and lock-in receiver 379. Notably however, as illustrated at FIG. 4, because detection sensors 307 and 308 comprise non-detecting detection sensors 367 (FIG. 3), switch 475 is open to decouple data line 471 from multiplexer module 474, thereby isolating detection sensors 307 and 308 from amplifier 378 and lock-in receiver 379. Meanwhile, because detection sensors 315 and 316 comprise detecting detection sensors 366 (FIG. 3), switch 476 is closed to couple data line 472 with multiplexer module 474 and further with amplifier 378 and lock-in receiver 379.

Notably, DSA 300 is illustrated as an eight by eight pixel ISA. However, DSA 300 (and DSA 101 (FIG. 1)) can comprise any suitable quantity of pixels. For example, in many embodiments, DSA 300 can comprise a 1024 by 1024 pixel ISA. Further, DSA 300 (and DSA 101 (FIG. 1)) can comprise any suitable arrangement of pixels.

Turning ahead again in the drawings, FIG. 5 illustrates an exemplary block diagram of DSA 500 in an operational state for a particular loop, according to the embodiment of FIG. 1. DSA 500 can be similar or identical to DSA 300 (FIG. 3) and/or DSA 101 (FIG. 1), and vice versa, and the operational state of DSA 500 can be similar or identical to the operational state described above with respect to DSA 101 (FIG. 1) and/or DSA 300 (FIG. 3), and vice versa. However, FIG. 5 demonstrates the operational state when electromagnetic radiation received at DSA 500 in the form of electric beam 568 comprises an irregular shape such that electric beam 568 comprises beam portions 579 and 580. Beam portions 579 and 580 can comprise higher intensity than the remainder of electric beam 568. For example, interference and/or diffraction, etc. of electric beam 568 can cause cause electric beam to have an irregular shape. Nonetheless, electric beam 568 can be similar or identical to electric beam 368 (FIG. 3).

Similar to DSA 300 (FIG. 3), DSA 500 comprises multiple detection sensors 565, and multiple detection sensors 565 comprise detection sensors 501 through 564. Multiple detection sensors 565 can be similar or identical to multiple detection sensors 103 (FIG. 1) and/or multiple detection sensors 365 (FIG. 3), and detection sensors 501 through 564 can be similar or identical to detection sensors 301 through 364 (FIG. 3).

As can be seen at FIG. 5, detection sensors 510-512, 518-520, and 526-528 are shown as detecting detection sensors 566 while detection sensors 501-509, 513-517, 521-525, 529-536, 540-544, 548-552, and 556-564 are shown as non-detecting detection sensors 567. In these embodiments, detecting detection sensors 566 and non-detecting detection sensors 567 would likely be determined by one or more criteria other than an all or nothing criterion. For example, the criteria could be receiving at least a predetermined or threshold amount of electromagnetic radiation where the predetermined or threshold amount exceeds zero electromagnetic radiation (e.g., the remaining portions of electric beam 568 could provide some electromagnetic radiation albeit less than beam portions 579 and 580). Detecting detection sensors 566 can be similar or identical detecting detection sensors 366 (FIG. 3) and/or the detecting detection sensors described above with respect to DSA 101 (FIG. 1). Further, non-detecting detection sensors 567 can be similar or identical to non-detecting detection sensors 367 and/or the non-detecting detection sensors described above with respect to DSA 101 (FIG. 1).

Under the more basic implementation discussed with respect to DSA 300 (FIG. 3), detecting beam portions 579 and 580 would not be possible, or at least not optimal, because disabling detection sensors 513-515, 521-523, and 529-531 and detection sensors 534-536, 542-544, and 550-552 when designated as non-detecting detection sensors 567 would have the effect of disabling detection sensors 510-512, 518-520, and 526-528 and detection sensors 537-539, 545-547, and 553-555, though designated as detecting detection sensors 566. As a result, beam portions 579 and 580 would go undetected and unidentified.

Although in some embodiments, certain non-detecting detection sensors (e.g., detection sensors 501-509, 516, 517, 524, 525, 532, 533, 540, 541, 548, 549, and 556-564) could be disabled to reduce at least some noise while leaving other non-detecting detection sensors (e.g., detection sensors 513-515, 521-523, and 529-531 and detection sensors 534-536, 542-544, and 550-552) enabled to permit the detecting detection sensors (e.g., detection sensors 510-512, 518-520, and 526-528 and detection sensors 537-539, 545-547, and 553-555) to be detected and identified and accepting the other non-detecting detection sensors will contribute some degree of noise, other, potentially more advantageous (e.g., accurate), options exist for addressing the irregularity of electric beam 568.

In some embodiments, for example if beam portions 579 and 580 are small and begin to approach pixel sized dimensions, DSA 500 can be partitioned into multiple smaller sub-blocks, where each of the multiple smaller sub-blocks is operated in accordance with the basic implementation discussed above with respect to DSA 300 (FIG. 3). Partitioning DSA 500 can be implemented in a manner similar to the partitioning of commercial memory chips (DRAM, SRAM, NVM, etc.). In these embodiments, the gate driver(s), decoder(s), multiplexer(s), etc. of a control module controlling DSA 500 could be integrated directly into DSA 500 and implemented via TFT circuits. Such a control module could be similar or identical to control module 102 (FIG. 1) and/or control module 377 (FIG. 3). However, integrating the elements of the control module directly into DSA 500 would consume device surface area of DSA 500, and given the circuit limitations associated with TFT devices, specifically (i) unavailability of p-channel TFT devices and (ii) low TFT mobility as compared to silicon CMOS devices, these embodiments may present issues.

In other embodiments, for example if beam portions 579 and 580 are larger, DSA 500 can simply comprise multiple abutting detection sensor sheets, as discussed in greater detail below, and each detection sensor sheet can implement the basic architecture, respectively. In many embodiments, a single control module can be implemented to run the multiple detection sensor sheets or separate control modules can be implemented for each of the multiple detection sensor sheets, respectively. In these embodiments, operation of the multiple detection sensor sheets can be coordinated or self contained. In some embodiments, the multiplexed outputs from the data lines of the multiple detection sensor sheets can even be combined together and connected to a single lock-in receiver, if desired.

In general, the size and resolution of DSA 500 can be set by the characteristics of electric beam 568 (and/or beam portions 579 and 580). Moreover, the size of multiple detection sensors 565 can be adjusted according to the radius of curvature of electric beam 568 (and/or beam portions 579 and 580), such as, for example, to optimize the selection algorithm when sampling multiple detection sensors 565 in a test state. The test state can be similar or identical to the test state described above with respect to DSA 101 (FIG. 1). These same ideas can apply equally to DSA 101 (FIG. 1) and/or DSA 300 (FIG. 3).

Referring back to FIG. 1, if electromagnetic radiation received at DSA 101 is sufficiently weak for individual detection sensors of multiple detection sensors 103 to detect electromagnetic radiation, a shape of the electromagnetic radiation can be approximately determined by employing spatial frequency analysis. For example, initially, control module 102 could operate DSA 101 in the test state. Then, control module 102 could begin partitioning DSA 101 into progressively smaller sub-sections (e.g., halves, quarters, etc.) and systematically sampling the detection sensors of multiple detection sensors 103 in each of the discrete sub-sections (e.g., for a suitable number of higher spatial frequencies). The resulting signal output can then be algorithmically combined to determine the shape of the electromagnetic radiation.

In these or other embodiments, to improve the initial detection of electromagnetic radiation and/or the optical detection sensitivity of DSA 101, one or more crystal avalanche photodiodes can be included at DSA 101. The improved sensitivity and detectability at these few points could greatly accelerate determining a shape of the electromagnetic radiation. However, in other embodiments, DSA 101 can be devoid of photomultiplier tubes (PMTS) and/or crystal avalanche photodiodes.

In further embodiments, DSA 101 can further be configured to adapt to a spatially variable or moving emission of electromagnetic radiation by implementing two-way communication between (a) DSA 101 and/or control module 102 and (b) emitter 104. For example, by embedding and periodically repeating at a predetermined interval a known string of steering bits in the emitted electromagnetic, referred to herein as a steering bit sequence) and by knowing and recognizing the digital signal in the steering bit sequence that needs to be decoded (e.g., an alternating string of binary numbers), a processing algorithm implemented by control module 102 during the test state can more quickly determine whether or not each detection sensor of multiple detection sensors 103 has detected electromagnetic radiation. Also, with a periodic known or fixed sampling interval for the steering bit sequence, the two-way communication can be configured so not to drop any signal bits when the receiver periodically toggles into the test state to dynamically adapt or reconfigure DSA 101 and/or multiple detection sensors 103 to moving or spatially changing electromagnetic radiation. More specifically, the test mode can permit a location of received electromagnetic radiation at DSA 101 to be determined with respect to DSA 101. Accordingly, with the ability to identify the location of electromagnetic radiation at DSA 101, DSA 101 and/or emitter 104 can be steered (e.g., repositioned) with respect to one another, such as, for example, to center a position of the electromagnetic radiation with respect to DSA 101 and/or to increase (e.g., maximize) a quantity of the electromagnetic radiation received at DSA 101.

Figure 6:
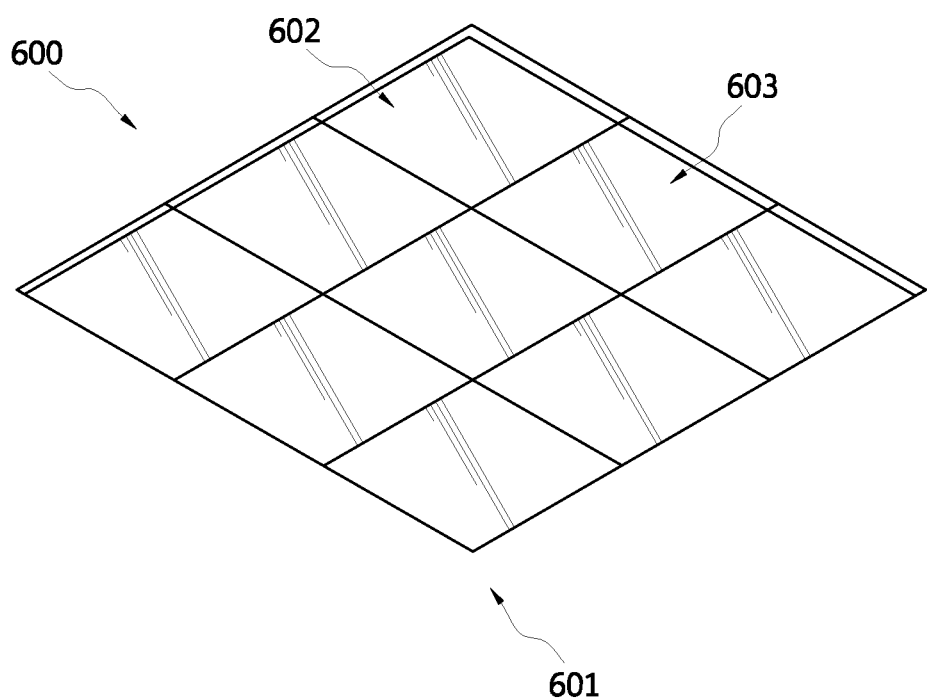
FIG. 6 illustrates an exemplary detection sensor array, according to the embodiment of FIG. 1.

Turning ahead again in the drawings, FIG. 6 illustrates an exemplary DSA 600, according to the embodiment of FIG. 1. DSA 600 can be similar or identical to DSA 101 (FIG. 1), DSA 300 (FIG. 3), and/or DSA 500 (FIG. 5), and vice versa.

DSA 600 can comprise one or more detection sensor sheets 601. When detection sensor sheet(s) 601 comprise multiple detection sensor sheets, each detection sensor sheet of the multiple detection sensor sheets can form a discrete element of the larger, aggregate DSA 600.

When detection sensor sheet(s) 601 comprise multiple detection sensor sheets, the multiple detection sensor sheets of detection sensor sheet(s) 601 can be configured and/or laid out in an array grid. The array grid comprises an array grid sheet length and an array grid sheet width. The array grid sheet length can be defined in terms of a number of detection sensor sheets of which DSA 600 comprises in a longitudinal direction, and the array grid sheet width can be defined in terms of a number of detection sensor sheets of which DSA 600 comprises in a lateral direction. In many embodiments, DSA 600 can comprise a regular Cartesian grid, but in other embodiments, can comprise any other suitable type of grid. For instance, in these other examples, the array grid can be asymmetric and/or discontinuous.

When detection sensor sheet(s) 601 comprise multiple detection sensor sheets, the multiple detection sensor sheets of detection sensor sheet(s) 601 can comprise as many detection sensor sheets as are suitable to implement DSA 600 of a desired size. That is, DSA 600 can be expanded to any desired size by adding more detection sensor sheets thereto. Thus, the array grid sheet length and/or the array grid sheet width can comprise any suitable number of detection sensor sheets. However, in many embodiments, the array grid sheet length and/or the array grid sheet width can comprise at least three detection sensor sheets of the multiple detection sensor sheets of detection sensor sheet(s) 601. Accordingly, in these examples, the multiple detection sensor sheets of detection sensor sheet(s) 601 can comprise at least nine detection sensor sheets arranged in a regular Cartesian grid. Further, although in these and other embodiments, the array grid can comprise a two-dimensional grid, in some embodiments, the array grid can comprise a one-dimensional (e.g., linear) grid, such as, for example, where one of the array grid sheet length or the array grid sheet width comprises one detection sensor sheet and the other one of the array grid sheet length or the array grid sheet width comprises multiple detection sensor sheets.

When detection sensor sheet(s) 601 comprise multiple detection sensor sheets, the multiple detection sensor sheets of detection sensor sheet(s) 601 can be configured to abut and/or partially overlap one another (e.g., at least one or two other detection sensor sheets of the multiple detection sensor sheets of detection sensor sheet(s) 601) when arranged in the array grid. The lines along which the multiple detection sensor sheets of detection sensor sheet(s) 601 abut and/or overlap each other can be referred to as seams. In many embodiments, when the multiple detection sensor sheets of detection sensor sheet(s) 601 are partially overlapping one another (e.g., at least one or two other detection sensor sheets of the multiple detection sensor sheets of detection sensor sheet(s) 601) when arranged in the array grid, DSA 600 can remain approximately planar (e.g., flat) across one or more device surfaces of DSA 600. Meanwhile, in many examples, a variation in the surface of device surface(s) can be limited to a thickness of one substrate layer of any detection sensor sheet of the multiple detection sensor sheets and/or an extent to which multiple detection sensors 603 (as discussed below) project outward from their respective substrate layers. For example, the variation in the surface of the device surface(s) can be greater than or equal to approximately 0 micrometers and less than or equal to approximately 200 micrometers.

DSA 600 comprises an approximately constant and/or continuous pixel and/or dot pitch. Further, each detection sensor sheet of detection sensor sheet(s) 601 can be configured such that the approximately constant and/or continuous pixel pitch. Further still, when detection sensor sheet(s) 601 comprise multiple detection sensor sheets, each detection sensor sheet of detection sensor sheet(s) 601 can be configured such that the approximately constant and/or continuous pixel pitch remains undisrupted when any detection sensor sheet of the multiple detection sensor sheets of detection sensor sheet(s) 601 partially overlaps one or more other detection sensor sheets (e.g., at least one or two other detection sensor sheets of the multiple detection sensor sheets of detection sensor sheet(s) 601) of the multiple detection sensor sheets of detection sensor sheet(s) 601. Thus, the pixel pitch remains approximately constant even across the seams of DSA 600.

In many embodiments, the pixel pitch can be less than or equal to approximately 400 micrometers and greater than or equal to approximately 25 micrometers. In various embodiments, the pixel pitch can be approximately 50 micrometers. Accordingly, the resolution of each detection sensor sheet of detection sensor sheet(s) 601 can be similar or identical to the pixel pitch of DSA 600.

DSA 600 can be flexible such that DSA 600 forms one or more substantially continuous curves. In some embodiments, DSA 600 can be sufficiently flexible to curve smoothly across DSA 600. In other embodiments, DSA 600 can be polygonal in order to approximate a desired curvature of DSA 600. By adding additional detection sensor sheets to DSA 600, it may be possible to more closely approximately the desired curvature of DSA 600.

When detection sensor sheet(s) 601 comprise multiple detection sensor sheets, each detection sensor sheet of the multiple detection sensor sheets can be coupled (i.e., mechanically) to at least one other detection sensor sheet of multiple detection sensor sheets, such as, for example, by an adhesive material and/or an adhesive tape. In these embodiments, the adhesive material and/or the adhesive tape can be optically transparent. In many examples, some detection sensor sheets of the multiple detection sensor sheets can be coupled to multiple (e.g., two, three, or four) other detection sensor sheets of the multiple detection sensor sheets. Coupling multiple detection sensor sheets together can help to hold the multiple detection sensor sheets together as DSA 600. In other embodiments, the multiple detection sensor sheets are not coupled to each other.

When detection sensor sheet(s) 601 comprise multiple detection sensor sheets, each detection sensor sheet of detection sensor sheet(s) 601 can be modular with any other detection sensor sheets of detection sensor sheet(s) 601. That is, each detection sensor sheet of detection sensor sheet(s) 601 can be the same such that any detection sensor sheet of detection sensor sheet(s) 601 can be interchanged with any other detection sensor sheet of detection sensor sheet(s) 601.

Detection sensor sheet(s) 601 can comprise one or more device substrate(s) 602, respectively (i.e., each detection sensor sheet of detection sensor sheet(s) 601 can comprise one device substrate of device substrate(s) 602). Device substrate (s) 602 can refer to the substrate(s) of DSA 600 comprising multiple detection sensors 603. Specifically, multiple detection sensors 603 can be located over device substrate(s) 602. Multiple detection sensors 603 can be similar or identical multiple detection sensors 103 (FIG. 1), multiple detection sensors 365 (FIG. 3), and/or multiple detection sensors 565 (FIG. 5), and vice versa.

Device substrate(s) 602 can comprise one or more flexible substrates, respectively (i.e., each detection sensor sheet of detection sensor sheet(s) 601 can comprise one device substrate of device substrate(s) 602).

When device substrate(s) 602 comprise flexible substrate(s), the flexible substrate(s) each can comprise a free-standing substrate that comprises a flexible material which readily adapts its shape. For example, the flexible material can comprise polyethylene naphthalate (PEN), polyethylene terephthalate (PET), polyethersulfone (PES), polyimide, polycarbonate, cyclic olefin copolymer, and/or liquid crystal polymer. An exemplary polyimide flexible material can be Kapton polyimide film as manufactured by E. I. du Pont de Nemours and Company of Wilmington, Del. The flexible substrate(s) each can comprise a flexible substrate width (e.g., approximately 102 millimeters to approximately 350 millimeters), length (e.g., approximately 102 millimeters to approximately 450 millimeters), and thickness (e.g., greater than or equal to approximately 50 micrometers and less than or equal to approximately 200 micrometers). Although exemplary flexible substrate widths, lengths, and/or thicknesses are provided, the flexible substrate width, length, and/or thickness of the flexible substrate(s) can be any suitable flexible substrate width, length, and/or thickness, provided the flexible substrate(s) remains suitably flexible to permit the flexible substrate(s) to readily adapt in shape. Further, in some embodiments, the flexible substrate(s) can be optically transparent and/or conformal.

Multiple detection sensors 603 can be provided (e.g., formed) over device substrate(s) 602. In some embodiments, multiple detection sensors 603 can be provided to comprise an n-type enhancement mode TFT with a bottom metal gate, inverted-staggered structure, and an active channel passivation layer. In these embodiments, when device substrate(s) 602 comprise flexible substrate(s), to avoid exceeding a substrate-glass transition temperature of device substrate(s) 602, the processing temperature for forming multiple detection sensors 603 can be less than or equal to approximately 180° C.

In some embodiments, molybdenum can be patterned over device substrate(s) 602 to form a gate metal layer, followed by a thin film deposition sequence that includes a gate dielectric layer, an active channel layer, and a protective passivation layer. The active device layer can comprise amorphous silicon, and the gate dielectric and protective layers can comprise silicon nitride. Contacts can be opened to the active layers. Source/drain metal interconnects can be deposited using an N+ doped amorphous silicon and aluminum bi-layer. A low dielectric constant material can be sprayed on as an insulating inter-level dielectric layer, after which vias can be opened to the source/drain metal layer.

Multiple detection sensors 603 can be provided according to a full fill factor approach. The via in each of multiple detection sensors 603 can be coupled to an isolated molybdenum mushroom metal pad that, in combination with a coincident patterned N+ doped a-Si layer, can define a cathode connection to a photodiode of each detection sensor and can provide electrical isolation between detection sensors. In some embodiments, to provide the photodiode, a continuous layer of intrinsic a-Si can be deposited next and combined with an in-situ deposited layer of P+ doped a-Si, followed by an indium tin oxide (ITO) transparent conductor, to form a light absorption layer and a global anode. In these embodiments, the photodiode can comprise a PIN photodiode. In other embodiments, to provide the photodiode, the same underlying method up to the definition of the cathode for the PIN photodiode can be used to instead provide a high gain a-Si avalanche photodiode. In these embodiments, an a-Si deposition sequence for the a-Si avalanche photodiode can start with a patterned N+ doped a-Si layer. The N+ doped a-Si layer can comprise a the cathode of the a-Si avalanche photodiode. Further, the N+ doped a-Si layer can comprise a thickness of approximately 1000 Angstroms. Next, continuous a-Si layers can be provided over the N+ doped a-Si layer. First, an intrinsic a-Si layer can be provided over the N+ doped a-Si layer. This intrinsic a-Si layer can comprise a thickness of approximately 400 Angstroms. Next, a P+a-Si layer can be provided over the intrinsic a-Si layer. This P+a-Si layer can comprise a thickness of approximately 100 Angstroms. Next, a second intrinsic a-Si layer can be provided over the P+a-Si layer. This second intrinsic a-Si layer can comprise a thickness of approximately 4000 Angstroms. Next, a second P+a-Si layer can be provided over the second intrinsic a-Si layer. This second P+a-Si layer can comprise a thickness of approximately 150 Angstroms. The continuous a-Si layers can be capped by a transparent ITO conductor layer.

Although some specific examples by which multiple detection sensors 603 can be provided are described above, multiple detection sensors 603 can be provided according to any suitable semiconductor manufacturing techniques. U.S. patent application Ser. No. 13/298,451, filed on Nov. 17, 2011 and registered as U.S. Pat. No. 8,999,778 on Mar. 15, 2012, describes various embodiments of semiconductor manufacturing techniques suitable for providing multiple detection sensors 603. Further, International Patent Application Serial Number PCT/US2011/037207, filed on May 19, 2011 and published as International Patent Publication Serial Number WO2012/021196 on Feb. 16, 2012, also describes various embodiments of semiconductor manufacturing techniques suitable for providing multiple detection sensors 603.

Further, although some specific examples by which DSA 600 can be provided are described above, DSA 600 can be provided according to any manufacturing techniques. International Patent Application Serial Numbers (i) PCT/US2013/045334, filed on Jun. 12, 2013 and published as International Patent Publication Serial Number WO2013/188498 on Dec. 19, 2013, (ii) PCT/US2013/058293, filed on Sep. 5, 2013 and published as International Patent Publication Serial Number WO2014/039698 on Mar. 13, 2014, and (iii) PCT/US2013/058284, filed on Sep. 5, 2013 and published as International Patent Publication Serial Number WO2014/039693 on Mar. 13, 2014, describe various embodiments of manufacturing techniques suitable for providing DSA 600.

U.S. Pat. No. 8,999,778, International Patent Application Serial Number PCT/US2011/037207, International Patent Application Serial Number PCT/US2013/045334, International Patent Application Serial Number PCT/US2013/058293, and International Patent Application Serial Number PCT/US2013/058284 are incorporated herein by reference in their entirety.

Turning now back to FIG. 1, DSA 101 can be approximately scaled to electromagnetic radiation (e.g., an electric beam, such as, for example, as used in free space optical communication) it is intended to detect and identify. The ability to approximately scale DSA 101 to electromagnetic radiation it is intended to detect and identify can be advantageous because electromagnetic radiation can be orders of magnitude larger than a detection aperture of a single conventional photodiode or PMT. As a result, much of the electromagnetic radiation can go undetected. Further, increasing a size or area of DSA 101 in general can increase a probability that the electromagnetic radiation will actually be captured or detected, especially in long distance situations where it is quite difficult to precisely align DSA 101 with emitter 104.

Further still, DSA 101 can be conformal, such as, for example, when DSA 101 comprises one or more device substrates similar or identical to device substrate(s) 602 (FIG. 6), and the device substrate(s) comprise one or more flexible substrates as discussed above with respect to device substrate(s) 602. Accordingly, DSA 101 can conform to surfaces as desirable.

As indicated previously, system 100 can be particularly well suited for free space optical communication applications. However, system 100 can also be well suited for other applications, such as, for example, imaging applications (e.g., medical, industrial, and/or security imaging).

For example, in these embodiments, DSA 101 may be only partially covered (e.g., occluded) by an object being imaged. Hence, like for an electric beam only partially covering DSA 101 in a free space optical communication application, without the adaptive functionality of system 100, multiple detection sensors 103 might detect undesirable noise where multiple detection sensors 103 are not covered by the object. Although a short duration low energy x-ray flash might be needed when operating DSA 101 in the test state, which may slightly increase patient x-ray radiation exposure for a digital radiography procedure where only a single x-ray image is required, the additional radiation would, in many examples, be inconsequential for industrial and/or security imaging. Further, for many medical imaging procedures where imaging occurs continuously, such as fluoroscopy where the diagnostic procedure can run several minutes, the additional patient radiation dose during the test state would in many examples be insignificant compared to the total patient radiation dose received during the operational state.

In these or other embodiments, the principal noise component in the non-detecting detection sensors can be shot noise caused by a time varying (e.g., transient) leakage current from the TFTs of the non-detecting detection sensors. When the non-detecting detections sensors are placed in the disabled state (e.g., by applying a negative gate bias to the TFT of the non-detecting detection sensors), in some examples, the TFT fails to fully deactivate immediately and injects a time varying charge directly onto the dataline(s) coupled thereto when DSA 101 is scanned, such as, for example, in the operational state. Although such injected transient leakage current can drop fairly rapidly with time (e.g., approximately three orders of magnitude after only 1 second), various implementations of system 100 (e.g., fluoroscopy x-ray imaging) may need DSA 101 to operate at high speed frame rates (e.g., video frame rates). In these examples, operating at video frame rates can mean scanning DSA 101 in the operational state every 0.03 seconds (e.g., equivalent to 30 frames per second). Meanwhile, the leakage current after 0.03 seconds may be approximately two orders of magnitude higher than the leakage current after 1 second. Accordingly, in these embodiments, it can be advantageous to disable the non-detecting detection sensors at least 1 second before scanning DSA 101 in the operational state and reconstructing the resulting image of an imaged object from the detecting detection sensors at a video frame rate. In other embodiments, instead of automatically determining the detecting and non-detecting detection sensors, the detecting detection sensors can be established manually (e.g., prior to the procedure).

When system 100 is implemented for imaging application, even where DSA 101 comprises an approximately 20 centimeter x-ray detector with 1024 rows, an approximate 30 frames per second readout rate, an approximate 100 micro second (µs) integration time, and detection sensor TFT transient leakage currents comparable the transient leakage currents discussed in the foregoing paragraph, the predicted shot noise can be close to approximately 450 electrons. This assumes a sampling point at approximately 0.015 sec, which averages the switching activity of the TFTs in one frame period. Given that conventional x-ray detection sensor arrays can comprise total noise levels approaching approximately 1500 electrons, the noise from the transient leakage current, as a percentage of the total, can be significant. Assuming an imaging application of system 100 where one third of multiple image sensors 103 in DSA 101 were disabled, the shot noise component could drop from approximately 450 electrons to approximately 300 electrons, reducing the overall system noise by approximately 10 percent. Lower noise can directly translate into the ability to detect a lower signal level. As a result, emitter 104 can be operated at a proportionally lower energy level, which can reduce the radiation exposure to the patient during a procedure.

Notably, in some embodiments, system 100 could be implemented in the reverse such that in the operational state, the detecting detection sensors are disabled and the non-detecting detection sensors are enabled. For example, this reverse implementation could be employed to determine the relative noise occurring in the system or for any other suitable application.

Figure 7:
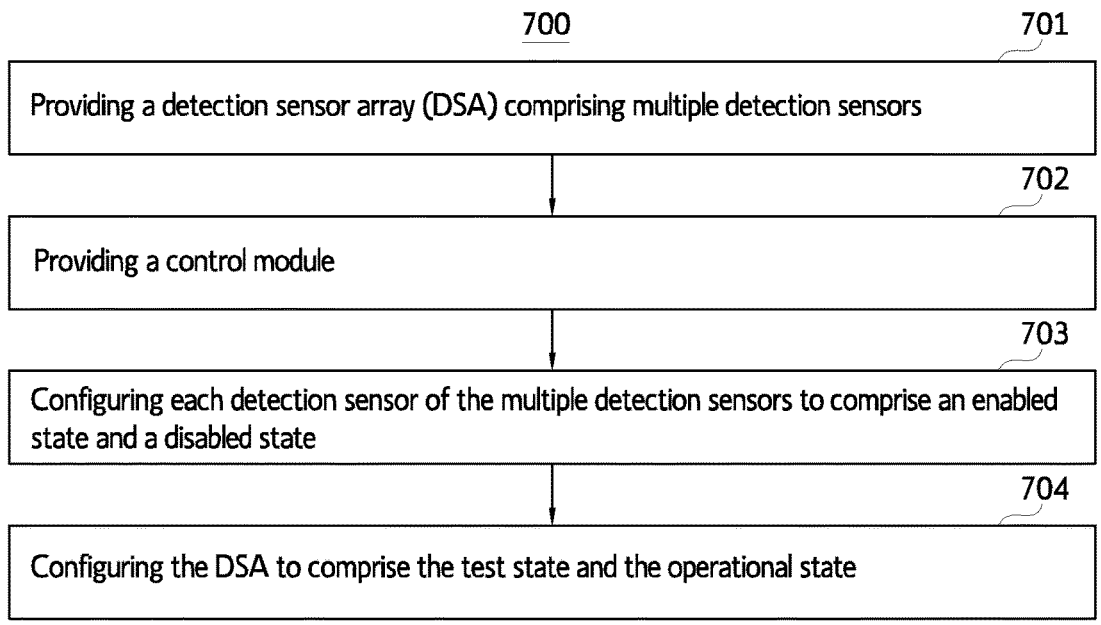
FIG. 7 illustrates a flow chart for an embodiment of a method of providing a system.

Turning ahead in the drawings, FIG. 7 illustrates a flow chart for an embodiment of method 700 of providing a system. Method 700 is merely exemplary and is not limited to the embodiments presented herein. Method 700 can be employed in many different embodiments or examples not specifically depicted or described herein. In some embodiments, the activities, the procedures, and/or the processes of method 700 can be performed in the order presented. In other embodiments, the activities, the procedures, and/or the processes of method 700 can be performed in any other suitable order. In still other embodiments, one or more of the activities, the procedures, and/or the processes in method 700 can be combined or skipped. In many embodiments, the system can be similar or identical to imaging system 100 (FIG. 1).

Figure 8:
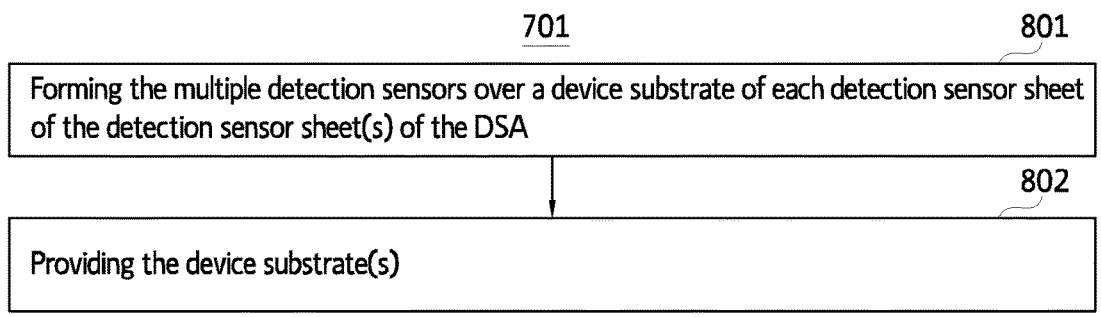
FIG. 8 illustrates an exemplary activity of providing a detection sensor array comprising multiple detection sensors, according to the embodiment of FIG. 7.

Method 700 can comprise activity 701 of providing a detection sensor array (DSA) comprising multiple detection sensors. The DSA can be similar or identical to DSA 101 (FIG. 1), DSA 300 (FIG. 3), DSA 500 (FIG. 5), and/or DSA 600 (FIG. 6). Further, the multiple detection sensors can be similar or identical to multiple detection sensors 103 (FIG. 1), multiple detection sensors 365 (FIG. 3), multiple detection sensors 565 (FIG. 5), and/or multiple detection sensors 603 (FIG. 6). In many embodiments, activity 701 can comprise an activity of providing on or more detection sensor sheets. FIG. 8 illustrates an exemplary activity 701, according to the embodiment of FIG. 7.

In some embodiments, activity 701 can comprise activity 801 of forming the multiple detection sensors over a device substrate of each detection sensor sheet of the detection sensor sheet(s) of the DSA. The detection sensor sheet(s) can be similar or identical to detection sensor sheet(s) 601 (FIG. 6). Further, the device substrate(s) can be similar or identical to device substrate(s) 602 (FIG. 6). In some embodiments, activity 801 can be omitted.

In these or other embodiments, activity 701 can comprise activity 802 of providing the device substrate(s). In many embodiments, activity 802 can be performed prior to activity 801.

Turning back to FIG. 7, method 700 can comprise activity 702 of providing a control module. The control module can be similar or identical to control module 102 (FIG. 1), control module 377 (FIG. 3), and/or the control module(s) described above with respect to DSA 500 (FIG. 5). In many embodiments, activity 702 can comprise an activity of configuring the control module to determine when the system operates in a test state and/or an operational state. In these embodiments, configuring the control module to determine when the system operates in the test state and/or the operational state can comprise an activity of configuring the control module to operate the detection sensor array in the test state and/or the operational state multiple times. The test state and/or operational state can be similar or identical to the test state and/or operational described above with respect to DSA 101 (FIG. 1), DSA 300 (FIG. 3), DSA 500 (FIG. 5), and/or DSA 600 (FIG. 6).

Further, method 700 can comprise activity 703 of configuring each detection sensor of the multiple detection sensors to comprise an enabled state and a disabled state. The enabled state and/or the disabled state can be similar or identical to the enabled state and/or disabled state described above with respect to multiple detection sensors 103 (FIG. 1), multiple detection sensors 365 (FIG. 3), multiple detection sensors 565 (FIG. 5), and/or multiple detection sensors 603 (FIG. 6).

Further still, method 700 can comprise activity 704 of configuring the DSA to comprise the test state and the operational state. In many embodiments, activity 703 and/or activity 704 can be performed as part of activity 701. In other embodiments, activity 703 and/or activity 704 can be performed after activity 701 and/or activity 702. Meanwhile, activity 701 can be performed before activity 702, after activity 702, and/or approximately simultaneously with activity 702.

Figure 9:
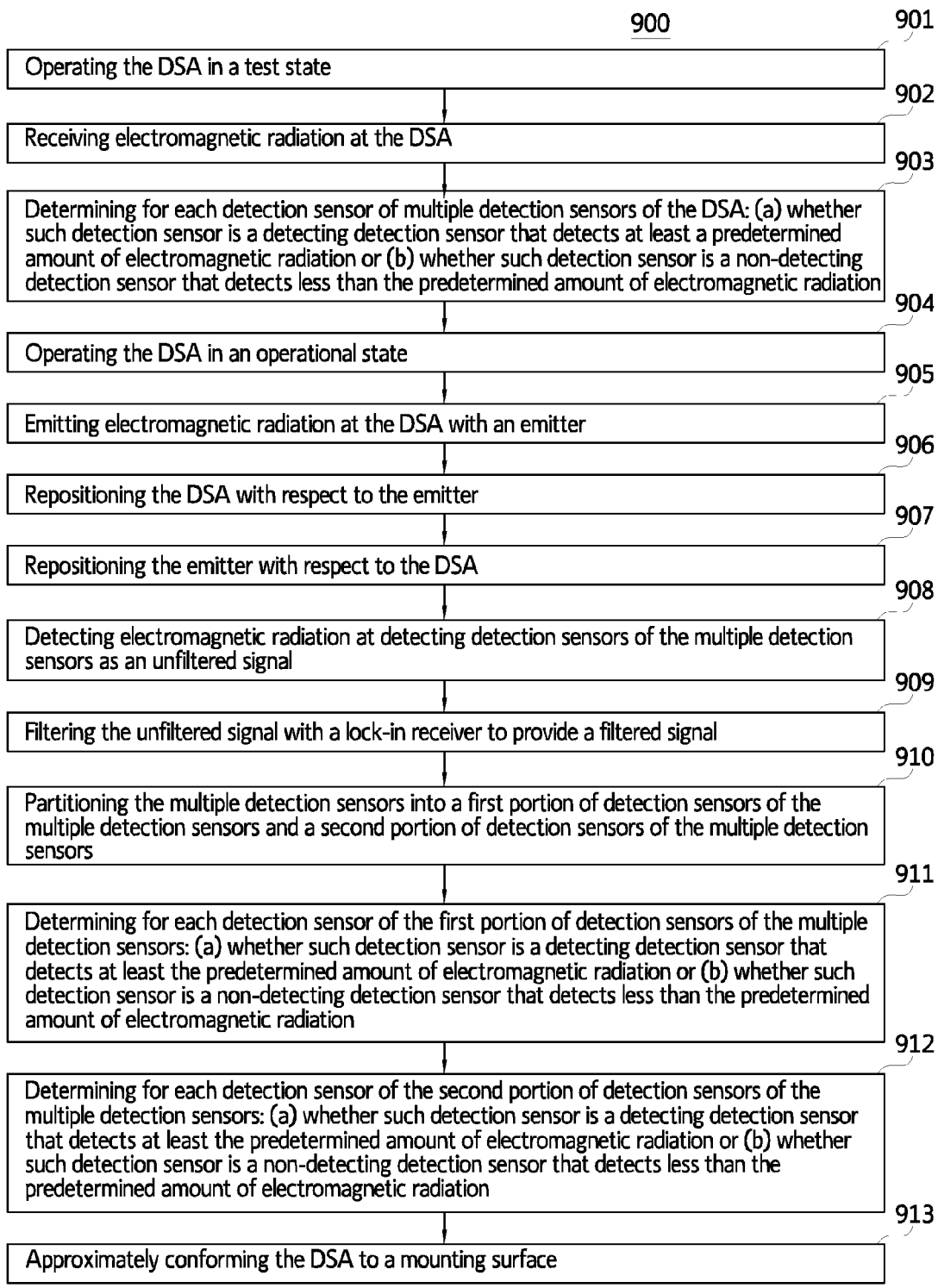
FIG. 9 illustrates a flow chart for an embodiment of a method of operating a detection sensor array (DSA)

Turning ahead in the drawings, FIG. 9 illustrates a flow chart for an embodiment of method 900 of operating a detection sensor array (DSA). Method 900 is merely exemplary and is not limited to the embodiments presented herein. Method 900 can be employed in many different embodiments or examples not specifically depicted or described herein. In some embodiments, the activities, the procedures, and/or the processes of method 900 can be performed in the order presented. In other embodiments, the activities, the procedures, and/or the processes of method 900 can be performed in any other suitable order. In still other embodiments, one or more of the activities, the procedures, and/or the processes in method 900 can be combined or skipped. In many embodiments, the DSA can be similar or identical to DSA 101 (FIG. 1), DSA 300 (FIG. 3), DSA 500 (FIG. 5), and/or DSA 600 (FIG. 6).

Method 900 can comprise activity 901 of operating the DSA in a test state. The test state can be similar or identical to the test state described above with respect to DSA 101 (FIG. 1), DSA 300 (FIG. 3), DSA 500 (FIG. 5), and/or DSA 600 (FIG. 6).

Method 900 can comprise activity 902 of receiving electromagnetic radiation at the DSA. Activity 902 can occur while activity 901 is performed. The electromagnetic radiation can be similar or identical to the electromagnetic radiation described above with respect to DSA 101 (FIG. 1), DSA 300 (FIG. 3), DSA 500 (FIG. 5), and/or DSA 600 (FIG. 6).

Method 900 can comprise activity 903 of determining for each detection sensor of multiple detection sensors of the DSA: (a) whether such detection sensor is a detecting detection sensor that detects at least a predetermined amount of electromagnetic radiation or (b) whether such detection sensor is a non-detecting detection sensor that detects less than the predetermined amount of electromagnetic radiation. Activity 903 can be performed while or after activity 902 occurs. The multiple detection sensors can be similar or identical to multiple detection sensors 103 (FIG. 1), multiple detection sensors 365 (FIG. 3), multiple detection sensors 565 (FIG. 5), and/or multiple detection sensors 603 (FIG. 6). Further, the detecting detection sensors and/or the non-detecting detection sensors can be similar or identical to the detecting detection sensors and/or the non-detecting detection sensors described above with respect to DSA 101 (FIG. 1), DSA 300 (FIG. 3), DSA 500 (FIG. 5), and/or DSA 600 (FIG. 6).

Method 900 can comprise activity 904 of operating the DSA in an operational state. Activity 904 can be performed while or after performing activity 903. The operational state can be similar or identical to the operational state described above with respect to DSA 101 (FIG. 1), DSA 300 (FIG. 3), DSA 500 (FIG. 5), and/or DSA 600 (FIG. 6). In many embodiments, activity 904 can comprise (i) an activity of selectively asserting one or more scan lines coupled to the DSA with a driver module, and/or (ii) an activity of selectively coupling one or more data lines to the DSA. The driver module can be similar or identical to drive module 113 (FIG. 1).

Method 900 can comprise activity 905 of emitting electromagnetic radiation at the DSA with an emitter. The emitter can be similar or identical to emitter 104 (FIG. 1). In some embodiments, activity 905 can comprise an activity of modulating the electromagnetic radiation emitted by the emitter. In many embodiments, activity 905 can be performed approximately simultaneously with one or more of activities 901-904.

Method 900 can comprise activity 906 of repositioning the DSA with respect to the emitter. In some embodiments, activity 906 can be omitted.

Method 900 can comprise activity 907 of repositioning the emitter with respect to the DSA. In some embodiments, activity 907 can be omitted.

Method 900 can comprise activity 908 of detecting electromagnetic radiation at detecting detection sensors of the multiple detection sensors as an unfiltered signal. In some embodiments, activity 908 can be performed while or after activity 904 is performed.

Method 900 can comprise activity 909 of filtering the unfiltered signal with a lock-in receiver to provide a filtered signal. Filtering the unfiltered signal can be performed in accordance with the functionality of the lock-in receiver as described above with respect to lock-in receiver 107 (FIG. 1). Accordingly, the lock-in receiver can be similar or identical to lock-in receiver 107 (FIG. 1). In some embodiments, activity 909 can be performed while or after activity 904 is performed. In some embodiments, activity 908 and/or activity 909 can be omitted.

Method 900 can comprise activity 910 of partitioning the multiple detection sensors into a first portion of detection sensors of the multiple detection sensors and a second portion of detection sensors of the multiple detection sensors. Activity 910 can be performed before activity 904 and/or after activity 903. The first portion of detection sensors of the multiple detection sensors can be different than the second portion of detection sensors of the multiple detection sensors, and/or a first quantity of the first portion of detection sensors of the multiple detection sensors can be approximately equal to a second quantity of the second portion of detection sensors of the multiple detection sensors.

Method 900 can comprise activity 911 of determining for each detection sensor of the first portion of detection sensors of the multiple detection sensors: (a) whether such detection sensor is a detecting detection sensor that detects at least the predetermined amount of electromagnetic radiation or (b) whether such detection sensor is a non-detecting detection sensor that detects less than the predetermined amount of electromagnetic radiation.

Method 900 can comprise activity 912 of determining for each detection sensor of the second portion of detection sensors of the multiple detection sensors: (a) whether such detection sensor is a detecting detection sensor that detects at least the predetermined amount of electromagnetic radiation or (b) whether such detection sensor is a non-detecting detection sensor that detects less than the predetermined amount of electromagnetic radiation. Activity 912 can be performed after activity 910, and/or can be performed simultaneously with activity 911.

Method 900 can comprise activity 913 of approximately conforming the DSA to a mounting surface. The mounting surface can comprise any suitable surface of an object. The object can comprise any suitable object (e.g., a satellite, a communication tower, a vehicle, etc.). Activity 913 can be performed prior to activities 901-912.

One or more of activities 901-912 can be performed one or more times, such as, for example, as part of a loop. In specific embodiments, activities 901-904 can be repeated multiple times as part of a loop.

Figure 10:
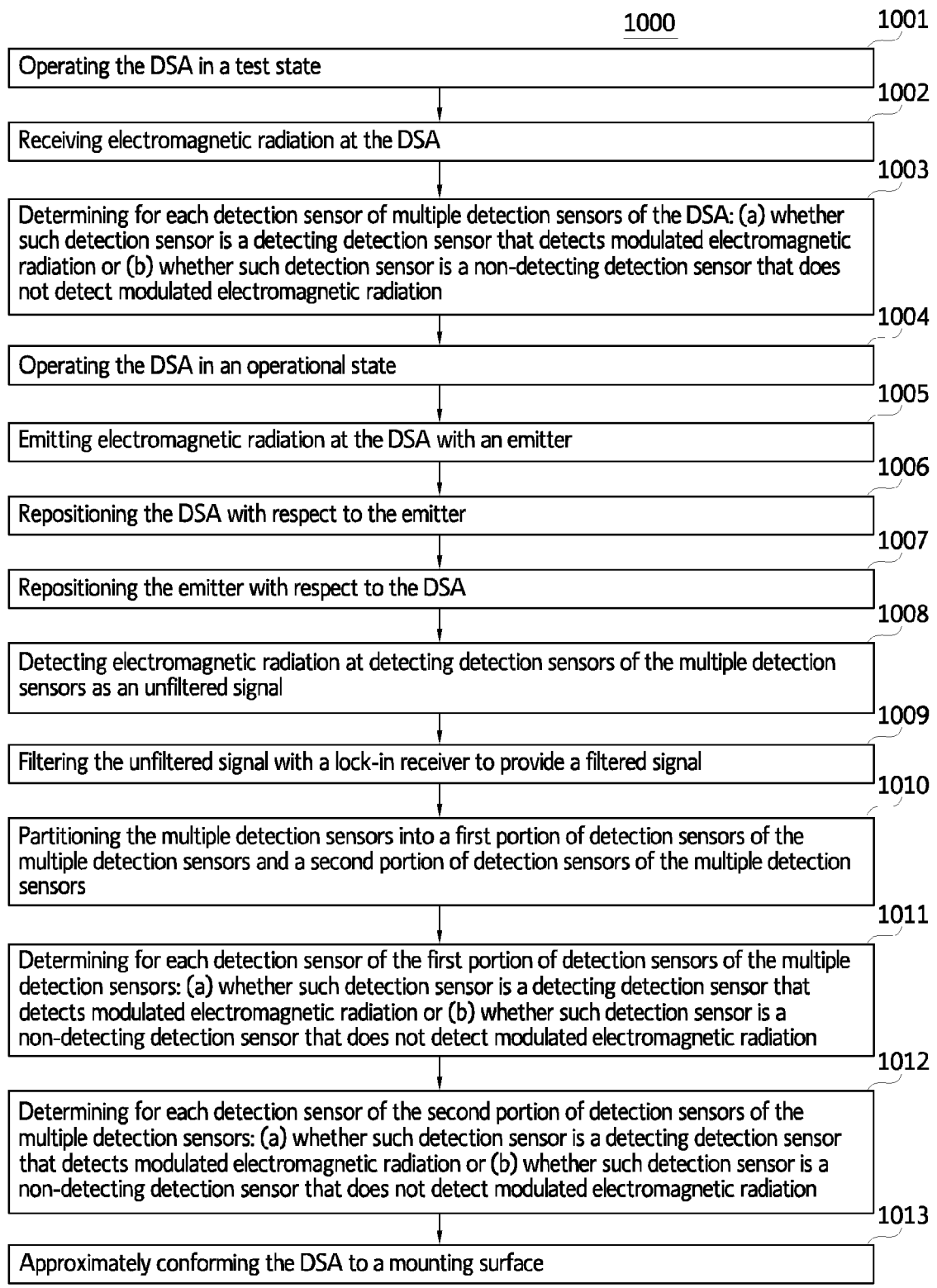
FIG. 10 illustrates a flow chart for another embodiment of a method of operating a DSA.

Turning ahead in the drawings, FIG. 10 illustrates a flow chart for an embodiment of method 1000 of operating a detection sensor array (DSA). Method 1000 is merely exemplary and is not limited to the embodiments presented herein. Method 1000 can be employed in many different embodiments or examples not specifically depicted or described herein. In some embodiments, the activities, the procedures, and/or the processes of method 1000 can be performed in the order presented. In other embodiments, the activities, the procedures, and/or the processes of method 1000 can be performed in any other suitable order. In still other embodiments, one or more of the activities, the procedures, and/or the processes in method 1000 can be combined or skipped. In many embodiments, the detection sensor array can be similar or identical to DSA 101 (FIG. 1), DSA 300 (FIG. 3), DSA 500 (FIG. 5), and/or DSA 600 (FIG. 6).

Method 1000 can comprise activity 1001 of operating the DSA in a test state. The test state can be similar or identical to the test state described above with respect to DSA 101 (FIG. 1), DSA 300 (FIG. 3), DSA 500 (FIG. 5), and/or DSA 600 (FIG. 6).

Method 1000 can comprise activity 1002 of receiving electromagnetic radiation at the DSA. Activity 1002 can occur while activity 1001 is performed. The electromagnetic radiation can be similar or identical to the electromagnetic radiation described above with respect to DSA 101 (FIG. 1), DSA 300 (FIG. 3), DSA 500 (FIG. 5), and/or DSA 600 (FIG. 6).

Method 1000 can comprise activity 1003 of determining for each detection sensor of multiple detection sensors of the DSA: (a) whether such detection sensor is a detecting detection sensor that detects modulated electromagnetic radiation or (b) whether such detection sensor is a non-detecting detection sensor that does not detect modulated electromagnetic radiation. Activity 1003 can be performed while or after activity 1002 occurs. The multiple detection sensors can be similar or identical to multiple detection sensors 103 (FIG. 1), multiple detection sensors 365 (FIG. 3), multiple detection sensors 565 (FIG. 5), and/or multiple detection sensors 603 (FIG. 6). Further, the detecting detection sensors and/or the non-detecting detection sensors can be similar or identical to the detecting detection sensors and/or the non-detecting detection sensors described above with respect to DSA 101 (FIG. 1), DSA 300 (FIG. 3), DSA 500 (FIG. 5), and/or DSA 600 (FIG. 6). In some embodiments, activity 1003 can further comprise an activity of determining for each detection sensor of the multiple detection sensors whether such detection sensor detects at least a predetermined amount of electromagnetic radiation.

Method 1000 can comprise activity 1004 of operating the DSA in an operational state. Activity 1004 can be performed while or after performing activity 1003. The operational state can be similar or identical to the operational state described above with respect to DSA 101 (FIG. 1), DSA 300 (FIG. 3), DSA 500 (FIG. 5), and/or DSA 600 (FIG. 6). In many embodiments, activity 1004 can comprise (i) an activity of selectively asserting one or more scan lines coupled to the DSA with a driver module, and/or (ii) an activity of selectively coupling one or more data lines to the DSA. The driver module can be similar or identical to drive module 113 (FIG. 1).

Method 1000 can comprise activity 1005 of emitting electromagnetic radiation at the DSA with an emitter. The emitter can be similar or identical to emitter 104 (FIG. 1). In some embodiments, activity 1005 can comprise an activity of modulating the electromagnetic radiation emitted by the emitter. In many embodiments, activity 1005 can be performed approximately simultaneously with one or more of activities 1001-1004.

Method 1000 can comprise activity 1006 of repositioning the DSA with respect to the emitter. In some embodiments, activity 1006 can be omitted.

Method 1000 can comprise activity 1007 of repositioning the emitter with respect to the DSA. In some embodiments, activity 1007 can be omitted.

Method 1000 can comprise activity 1008 of detecting electromagnetic radiation at detecting detection sensors of the multiple detection sensors as an unfiltered signal. In some embodiments, activity 1008 can be performed while or after activity 1004 is performed.

Method 1000 can comprise activity 1009 of filtering the unfiltered signal with a lock-in receiver to provide a filtered signal. Filtering the unfiltered signal can be performed in accordance with the functionality of the lock-in receiver as described above with respect to lock-in receiver 107 (FIG. 1). Accordingly, the lock-in receiver can be similar or identical to lock-in receiver 107 (FIG. 1). In some embodiments, activity 1009 can be performed while or after activity 1004 is performed. In some embodiments, activity 1008 and/or activity 1009 can be omitted.

Method 1000 can comprise activity 1010 of partitioning the multiple detection sensors into a first portion of detection sensors of the multiple detection sensors and a second portion of detection sensors of the multiple detection sensors. Activity 1010 can be performed before activity 1004 and/or after activity 1003. The first portion of detection sensors of the multiple detection sensors can be different than the second portion of detection sensors of the multiple detection sensors, and/or a first quantity of the first portion of detection sensors of the multiple detection sensors can be approximately equal to a second quantity of the second portion of detection sensors of the multiple detection sensors.

Method 1000 can comprise activity 1011 of determining for each detection sensor of the first portion of detection sensors of the multiple detection sensors: (a) whether such detection sensor is a detecting detection sensor that detects modulated electromagnetic radiation or (b) whether such detection sensor is a non-detecting detection sensor that does not detect modulated electromagnetic radiation. Activity 1011 can be performed after activity 1010.

Method 1000 can comprise activity 1012 of determining for each detection sensor of the second portion of detection sensors of the multiple detection sensors: (a) whether such detection sensor is a detecting detection sensor that detects modulated electromagnetic radiation or (b) whether such detection sensor is a non-detecting detection sensor that does not detect modulated electromagnetic radiation. Activity 1012 can be performed after activity 1010, and/or can be performed simultaneously with activity 1011.

Method 1000 can comprise activity 1013 of approximately conforming the DSA to a mounting surface. The mounting surface can comprise any suitable surface of an object. The object can comprise any suitable object (e.g., a satellite, a communication tower, a vehicle, etc.). Activity 1013 can be performed prior to activities 1001-1012.

One or more of activities 1001-1012 can be performed one or more times, such as, for example, as part of a loop. In specific embodiments, activities 1001-1004 can be repeated multiple times as part of a loop.

Figure 11:
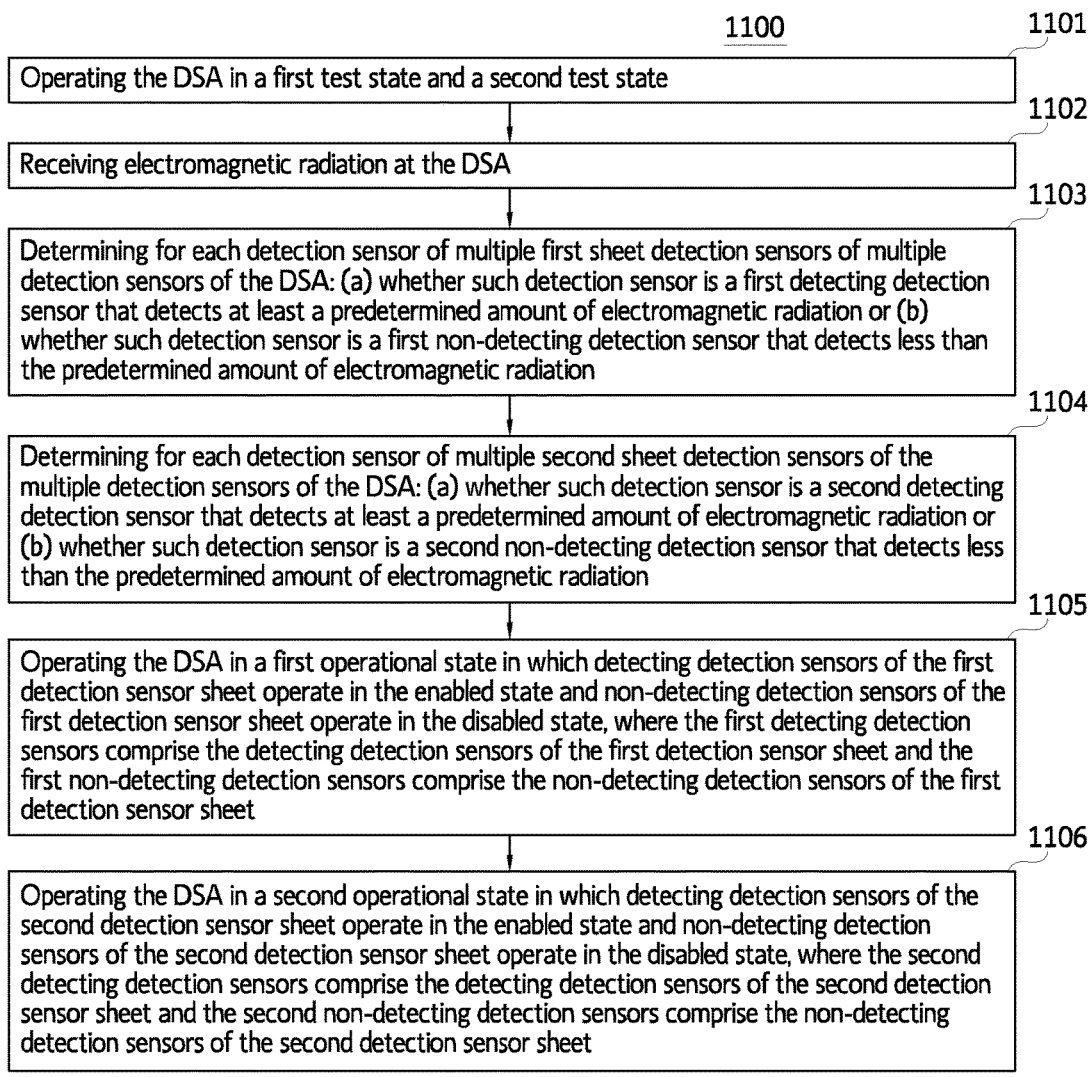
FIG. 11 illustrates a flow chart for another embodiment of a method of operating a DSA.

Turning ahead in the drawings, FIG. 11 illustrates a flow chart for an embodiment of method 1100 of providing a system. Method 1100 is merely exemplary and is not limited to the embodiments presented herein. Method 1100 can be employed in many different embodiments or examples not specifically depicted or described herein. In some embodiments, the activities, the procedures, and/or the processes of method 1100 can be performed in the order presented. In other embodiments, the activities, the procedures, and/or the processes of method 1100 can be performed in any other suitable order. In still other embodiments, one or more of the activities, the procedures, and/or the processes in method 1100 can be combined or skipped. In many embodiments, the system can be similar or identical to imaging system 100 (FIG. 1).

Method 1100 can comprise activity 1101 of operating the DSA in a first test state and a second test state. Under the first test state, all of multiple first sheet detection sensors of a first detection sensor sheet of the DSA can operate in an enabled state, and under the second test state, all of multiple second sheet detection sensors of a second detection sensor sheet can operate in the enabled state. The first test state and/or the second test state can be similar to the test state described above with respect to DSA 101 (FIG. 1), DSA 300 (FIG. 3), DSA 500 (FIG. 5), and/or DSA 600 (FIG. 6), but with respect to the first detection sensor sheet and/or the second detection sensor sheet. Further, the enabled state can be similar or identical to the enabled state described above with respect to multiple detection sensors 103 (FIG. 1), multiple detection sensors 365 (FIG. 3), multiple detection sensors 565 (FIG. 5), and/or multiple detection sensors 603 (FIG. 6).

Method 1100 can comprise activity 1102 of receiving electromagnetic radiation at the DSA. Activity 1102 can occur while activity 1101 is performed. The electromagnetic radiation can be similar or identical to the electromagnetic radiation described above with respect to DSA 101 (FIG. 1), DSA 300 (FIG. 3), DSA 500 (FIG. 5), and/or DSA 600 (FIG. 6).

Method 1100 can comprise activity 1103 of determining for each detection sensor of multiple first sheet detection sensors of multiple detection sensors of the DSA: (a) whether such detection sensor is a first detecting detection sensor that detects at least a predetermined amount of electromagnetic radiation or (b) whether such detection sensor is a first non-detecting detection sensor that detects less than the predetermined amount of electromagnetic radiation. Activity 1103 can be performed while or after activity 1102 occurs. The multiple detection sensors can be similar or identical to multiple detection sensors 103 (FIG. 1), multiple detection sensors 365 (FIG. 3), multiple detection sensors 565 (FIG. 5), and/or multiple detection sensors 603 (FIG. 6). Further, the first detecting detection sensors and/or the first non-detecting detection sensors can be similar or identical to the detecting detection sensors and/or the non-detecting detection sensors described above with respect to DSA 101 (FIG. 1), DSA 300 (FIG. 3), DSA 500 (FIG. 5), and/or DSA 600 (FIG. 6).

Method 1100 can comprise activity 1104 of determining for each detection sensor of multiple second sheet detection sensors of the multiple detection sensors of the DSA: (a) whether such detection sensor is a second detecting detection sensor that detects at least a predetermined amount of electromagnetic radiation or (b) whether such detection sensor is a second non-detecting detection sensor that detects less than the predetermined amount of electromagnetic radiation. Activity 1104 can be performed while or after activity 1102 occurs. Further, activity 1104 can be performed simultaneously or serially with activity 1103. Moreover, the second detecting detection sensors and/or the second non-detecting detection sensors can be similar or identical to the detecting detection sensors and/or the non-detecting detection sensors described above with respect to DSA 101 (FIG. 1), DSA 300 (FIG. 3), DSA 500 (FIG. 5), and/or DSA 600 (FIG. 6).

Method 1100 can comprise activity 1105 of operating the DSA in a first operational state in which detecting detection sensors of the first detection sensor sheet operate in the enabled state and non-detecting detection sensors of the first detection sensor sheet operate in the disabled state, where the first detecting detection sensors comprise the detecting detection sensors of the first detection sensor sheet and the first non-detecting detection sensors comprise the non-detecting detection sensors of the first detection sensor sheet. Activity 1105 can be performed while or after performing activity 1103 and/or activity 1104. The first operational state can be similar to the operational state described above with respect to DSA 101 (FIG. 1), DSA 300 (FIG. 3), DSA 500 (FIG. 5), and/or DSA 600 (FIG. 6), but with respect to the first detection sensor sheet.

Method 1100 can comprise activity 1106 of operating the DSA in a second operational state in which detecting detection sensors of the second detection sensor sheet operate in the enabled state and non-detecting detection sensors of the second detection sensor sheet operate in the disabled state, where the second detecting detection sensors comprise the detecting detection sensors of the second detection sensor sheet and the second non-detecting detection sensors comprise the non-detecting detection sensors of the second detection sensor sheet. Activity 1106 can be performed while or after performing activity 1103 and/or activity 1104. Further, activity 1106 can be performed simultaneously or serially with activity 1105. The second operational state can be similar to the operational state described above with respect to DSA 101 (FIG. 1), DSA 300 (FIG. 3), DSA 500 (FIG. 5), and/or DSA 600 (FIG. 6), but with respect to the second detection sensor sheet.

Figure 12:
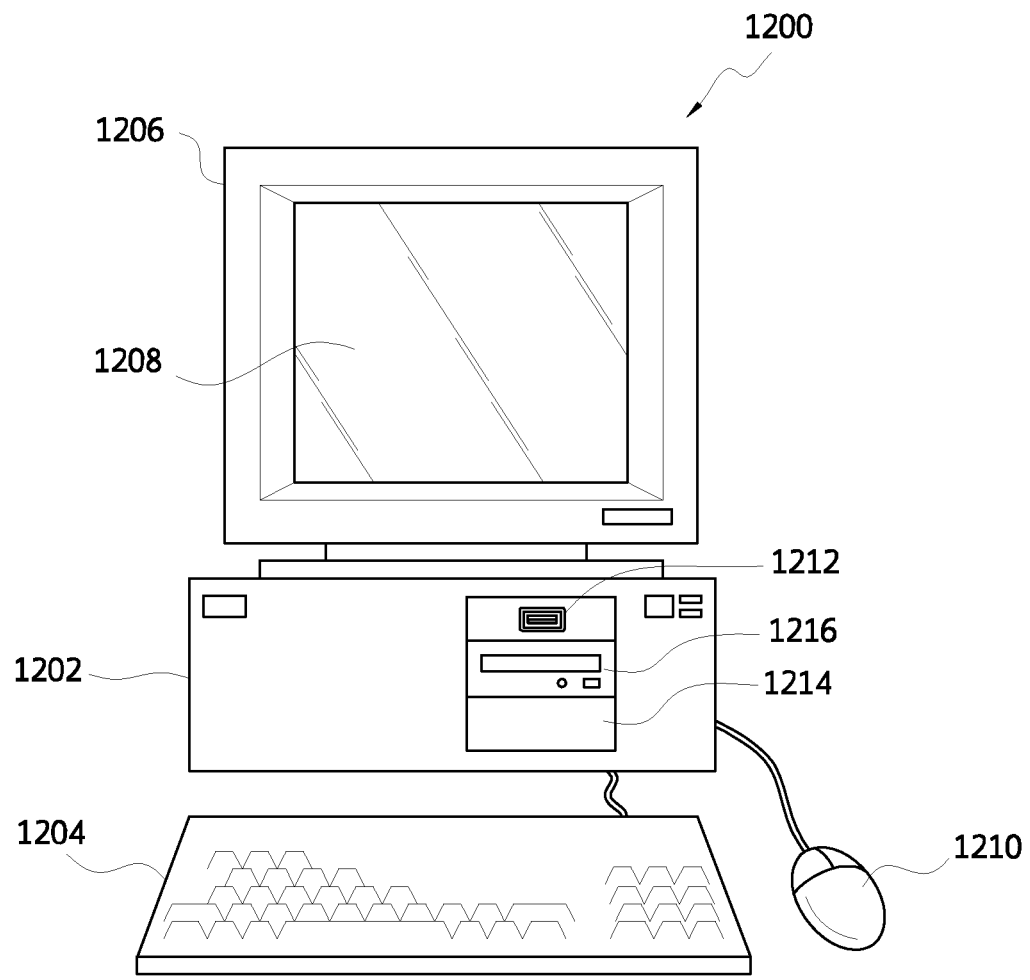
FIG. 12 illustrates a computer that is suitable for implementing an embodiment of at least part of the system of FIG. 1 and/or the methods of FIGS. 9-11.

Turning ahead in the drawing, FIG. 12 illustrates an exemplary embodiment of computer system 1200, all of which or a portion of which can be suitable for implementing part of the functionality of system 100 (FIG. 1), control module 102 (FIG. 1), control module 377 (FIG. 3), and/or the control module(s) described above with respect to DSA 500 (FIG. 5) as well as methods 900, 1000, and 1100 (FIGS. 9-11) and/or any of the various procedures, processes, and/or activities of methods 900, 1000, and 1100 (FIGS. 9-11). Computer system 1100 includes chassis 1202 containing one or more circuit boards (not shown), Universal Serial Bus (USB) 1212, Compact Disc Read-Only Memory (CD-ROM) and/or Digital Video Disc (DVD) drive 1216, and hard drive 1214. A representative block diagram of the elements included on the circuit boards inside chassis 1202 is shown in FIG. 12. Central processing unit (CPU) 1310 in FIG. 13 is coupled to system bus 1314 in FIG. 13. In various embodiments, the architecture of CPU 1310 can be compliant with any of a variety of commercially distributed architecture families.

System bus 1314 also is coupled to memory 1308, where memory 1308 includes both read only memory (ROM) and random access memory (RAM). Non-volatile portions of memory 1308 or the ROM can be encoded with a boot code sequence suitable for restoring computer system 1200 (FIG. 12) to a functional state after a system reset. In addition, memory 1308 can include microcode such as a Basic Input-Output System (BIOS). In some examples, the one or more storage modules of the various embodiments disclosed herein can include memory 1308, USB 1212 (FIGS. 12-13), hard drive 1214 (FIGS. 12-13), and/or CD-ROM or DVD drive 1216 (FIGS. 12-13). In the same or different examples, the one or more storage modules of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Examples of common operating systems can include Microsoft® Windows, Mac® operating system (OS), UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions.

In the depicted embodiment of FIG. 13, various I/O devices such as disk controller 1304, graphics adapter 1324, video controller 1302, keyboard adapter 1326, mouse adapter 1306, network adapter 1320, and other I/O devices 1322 can be coupled to system bus 1314. Keyboard adapter 1326 and mouse adapter 1306 are coupled to keyboard 1204 (FIGS. 12-13) and mouse 1210 (FIGS. 12-13), respectively, of computer system 1200 (FIG. 12). While graphics adapter 1324 and video controller 1302 are indicated as distinct units in FIG. 13, video controller 1302 can be integrated into graphics adapter 1324, or vice versa in other embodiments. Video controller 1302 is suitable for refreshing monitor 1206 (FIGS. 12-13) to display images on a screen 1208 (FIG. 12) of computer system 1200 (FIG. 12). Disk controller 1304 can control hard drive 1214 (FIGS. 12-13), USB 1212 (FIGS. 12-13), and CD-ROM drive 1216 (FIGS. 12-13). In other embodiments, distinct units can be used to control each of these devices separately.

In some embodiments, network adapter 1320 can be part of a WNIC (wireless network interface controller) card (not shown) plugged or coupled to an expansion port (not shown) in computer system 1200. In other embodiments, the WNIC card can be a wireless network card built into computer system 1200. A wireless network adapter can be built into computer system 1200 by having wireless Ethernet capabilities integrated into the motherboard chipset (not shown), or implemented via a dedicated wireless Ethernet chip (not shown), connected through the PCI (peripheral component interconnector) or a PCI express bus. In other embodiments, network adapter 1320 can be a wired network adapter.

Although many other components of computer system 1200 (FIG. 12) are not shown, such components and their interconnection are well known to those of ordinary skill in the art. Accordingly, further details concerning the construction and composition of computer system 1200 and the circuit boards inside chassis 1202 (FIG. 12) are not discussed herein.

When computer system 1200 in FIG. 12 is running, program instructions stored on a USB-equipped electronic device connected to USB 1212, on a CD-ROM or DVD in CD-ROM and/or DVD drive 1216, on hard drive 1214, or in memory 1308 (FIG. 13) are executed by CPU 1310 (FIG. 13). A portion of the program instructions, stored on these devices, can be suitable for carrying out at least part of system 100 (FIG. 1), control module 102 (FIG. 1), control module 377 (FIG. 3), and/or the control module(s) described above with respect to DSA 500 (FIG. 5) as well as methods 900, 1000, and 1100 (FIGS. 9-11) and/or any of the various procedures, processes, and/or activities of methods 900, 1000, and 1100 (FIGS. 9-11).

Although computer system 1200 is illustrated as a desktop computer in FIG. 12, there can be examples where computer system 1200 may take a different form factor (e.g., a mobile electronic device, a laptop computer, a microcontroller, a logic block, etc.) while still having functional elements similar to those described for computer system 1200. In some embodiments, computer system 1200 may comprise a single computer, a single server, or a cluster or collection of computers or servers, or a cloud of computers or servers. Typically, a cluster or collection of servers can be used when the demand on computer system 1200 exceeds the reasonable capability of a single server or computer.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that activities 701-704 of FIG. 7, activities 801 and 802 of FIG. 8, activities 901-913 of FIG. 9, activities 1001-1013, and/or activities 1101-1106 of FIG. 11 may be comprised of many different activities, procedures and be performed by many different modules, in many different orders that any element of FIGS. 1-13 may be modified and that the foregoing discussion of certain of these embodiments does not necessarily represent a complete description of all possible embodiments.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
a detection sensor array comprising multiple detection sensors, each detection sensor of the multiple detection sensors comprising an enabled state and a disabled state; and
a control module configured to operate the detection sensor array;
wherein:
under the enabled state, each detection sensor of the multiple detection sensors is configured to detect and identify electromagnetic radiation;
under the disabled state, each detection sensor of the multiple detection sensors is configured not to detect and identify electromagnetic radiation;
the detection sensor array comprises a test state and an operational state;
when the detection sensor array is in the test state, the detection sensor array is configured such that all of the multiple detection sensors operate in the enabled state and the control module is configured to determine for each detection sensor of the multiple detection sensors: (a) whether such detection sensor is a detecting detection sensor that detects at least a predetermined amount of electromagnetic radiation or (b) whether such detection sensor is a non-detecting detection sensor that detects less than the predetermined amount of electromagnetic radiation; and when the detection sensor array is in the operational state, the detection sensor array is configured such that detecting detection sensors of the multiple detection sensors operate in the enabled state and non-detecting detection sensors of the multiple detection sensors operate in the disabled state.

2. The system of claim 1 wherein:
the detection sensor array comprises at least one detection sensor sheet, each detection sensor sheet of the at least one detection sensor sheet comprising a device substrate, and the multiple detection sensors being located over the device substrate of each detection sensor sheet of the at least one detection sensor sheet.

3. The system of claim 2 wherein:
the device substrate comprises a flexible substrate.

4. The system of claim 1 wherein:
the control module is configured to determine when the detection sensor array operates in the test state and the operational state.

5. The system of claim 4 wherein:
the control module is configured to operate the detection sensor array in the test state and the operational state in a loop multiple times;
when the detection sensor array is in the test state during a first loop of the loop multiple times, the detection sensor array is configured such that all of the multiple detection sensors operate in the enabled state and the control module is configured to determine for each detection sensor of the multiple detection sensors: (a) whether such detection sensor is a first detecting detection sensor that detects at least the predetermined amount of electromagnetic radiation or (b) whether such detection sensor is a first non-detecting detection sensor that detects less than the predetermined amount of electromagnetic radiation;
for the first loop of the loop multiple times, first detecting detection sensors of the multiple detection sensors comprise the detecting detection sensors and first non-detecting detection sensors of the multiple detection sensors comprise the non-detecting detection sensors;
when the detection sensor array is in the operational state during the first loop of the loop multiple times, and after the detection sensor array is in the test state during the first loop of the loop multiple times, the detection sensor array is configured such that the first detecting detection sensors operate in the enabled state and the first non-detecting detection sensors operate in the disabled state;
when the detection sensor array is in the test state during a second loop of the multiple loop times, the detection sensor array is configured such that all of the multiple detection sensors operate in the enabled state and the control module is configured to determine for each detection sensor of the multiple detection sensors: (a) whether such detection sensor is a second detecting detection sensor that detects at least the predetermined amount of electromagnetic radiation or (b) whether such detection sensor is a second non-detecting detection sensor that detects less than the predetermined amount of electromagnetic radiation;
for the second loop of the loop multiple times, second detecting detection sensors of the multiple detection sensors comprise the detecting detection sensors and second non-detecting detection sensors of the multiple detection sensors comprise the non-detecting detection sensors; and when the detection sensor array is in the operational state during the second loop of the loop multiple times, and after the detection sensor array is in the test state during the second loop of the loop multiple times, the detection sensor array is configured such that the second detecting detection sensors operate in the enabled state and the second non-detecting detection sensors operate in the disabled state.

6. The system of claim 5 wherein:
the first detecting detection sensors are different by at least one detection sensor of the multiple detection sensors than the second detecting detection sensors; and
the first non-detecting detection sensors are different by at least one detection sensor of the multiple detection sensors than the second non-detecting detection sensors.

7. The system of claim 1 further comprising:
an emitter;
wherein:
the emitter is configured to emit at least one of modulated electromagnetic radiation or x-ray electromagnetic radiation at the detection sensor array.

8. The system of claim 1 wherein at least one of:
the detection sensor array comprises a passive detection sensor array; or
the detection sensor array is devoid of any photomultiplier tubes and silicon avalanche diodes.

9. The system of claim 1 wherein at least one of:
the control module comprises a driver module coupled to the detection sensor array;
the control module comprises a multiplexer module selectively coupled to the detection sensor array;
the system further comprises a lock-in receiver selectively coupled to the detection sensor array; or
the multiple detection sensors each comprise a pixel comprising a thin film transistor coupled to an amorphous silicon PIN diode.

10. The system of claim 1 wherein:
the detection sensor array comprises a passive detection sensor array;
the detection sensor array comprises at least one detection sensor sheet, each detection sensor sheet of the at least one detection sensor sheet comprising a device substrate, and the multiple detection sensors being located over the device substrate of each detection sensor sheet of the at least one detection sensor sheet;
the device substrate comprises a flexible substrate;
the control module is configured to determine when the detection sensor array operates in the test state and the operational state;
the control module is configured to operate the detection sensor array in the test state and the operational state in a loop multiple times;
when the detection sensor array is in the test state during a first loop of the loop multiple times, the detection sensor array is configured such that all of the multiple detection sensors operate in the enabled state and the control module is configured to determine for each detection sensor of the multiple detection sensors: (a) whether such detection sensor is a first detecting detection sensor that detects at least the predetermined amount of electromagnetic radiation or (b) whether such detection sensor is a first non-detecting detection sensor that detects less than the predetermined amount of electromagnetic radiation;
for the first loop of the loop multiple times, first detecting detection sensors of the multiple detection sensors comprise the detecting detection sensors and first non-detecting detection sensors of the multiple detection sensors comprise the non-detecting detection sensors;
when the detection sensor array is in the operational state during the first loop of the loop multiple times, and after the detection sensor array is in the test state during the first loop of the loop multiple times, the detection sensor array is configured such that the first detecting detection sensors operate in the enabled state and the first non-detecting detection sensors operate in the disabled state;
when the detection sensor array is in the test state during a second loop of the loop multiple times, the detection sensor array is configured such that all of the multiple detection sensors operate in the enabled state and the control module is configured to determine for each detection sensor of the multiple detection sensors: (a) whether such detection sensor is a second detecting detection sensor that detects at least the predetermined amount of electromagnetic radiation or (b) whether such detection sensor is a second non-detecting detection sensor that detects less than the predetermined amount of electromagnetic radiation;
for the second loop of the loop multiple times, second detecting detection sensors of the multiple detection sensors comprise the detecting detection sensors and second non-detecting detection sensors of the multiple detection sensors comprise the non-detecting detection sensors;
when the detection sensor array is in the operational state during the second loop of the loop multiple times, and after the detection sensor array is in the test state during the second loop of the loop multiple times, the detection sensor array is configured such that the second detecting detection sensors operate in the enabled state and the second non-detecting detection sensors operate in the disabled state;
the control module comprises a driver module coupled to the detection sensor array;
the control module comprises a multiplexer module selectively coupled to the detection sensor array;
the system further comprises a lock-in receiver selectively coupled to the detection sensor array; and
the multiple detection sensors each comprise a pixel comprising a thin film transistor coupled to an amorphous silicon PIN diode.

11. A method of providing a system, the method comprising:
providing a detection sensor array comprising multiple detection sensors;
providing a control module;
configuring each detection sensor of the multiple detection sensors to comprise an enabled state and a disabled state; and
configuring the detection sensor array to comprise a test state and an operational state;
wherein:
under the enabled state, each detection sensor of the multiple detection sensors is configured to detect and identify electromagnetic radiation;
under the disabled state, each detection sensor of the multiple detection sensors is configured not to detect and identify electromagnetic radiation;
when the detection sensor array is in the test state, the detection sensor array is configured such that all of the multiple detection sensors operate in the enabled state and the control module is configured to determine for each detection sensor of the multiple detection sensors: (a) whether such detection sensor is a detecting detection sensor that detects at least a predetermined amount of electromagnetic radiation or (b) whether such detection sensor is a non-detecting detection sensor that detects less than the predetermined amount of electromagnetic radiation; and when the detection sensor array is in the operational state, the detection sensor array is configured such that detecting detection sensors of the multiple detection sensors operate in the enabled state and non-detecting detection sensors of the multiple detection sensors operate in the disabled state.

12. The method of claim 11 wherein:
providing the detection sensor array comprises providing at least one detection sensor sheet, each detection sensor sheet of the at least one detection sensor sheet comprising a device substrate, and the multiple detection sensors being located over the device substrate of each detection sensor sheet of the at least one detection sensor sheet.

13. The method of claim 12 wherein:
providing the at least one detection sensor sheet comprises forming the multiple detection sensors over the device substrate of each detection sensor sheet of the at least one detection sensor sheet.

14. The method of claim 12 wherein:
providing the at least one detection sensor sheet comprises providing the device substrate, the device substrate comprising a flexible substrate.

15. The method of claim 11 wherein:
providing the control module comprises configuring the control module to determine when the system operates in the test state and the operational state.

16. The method of claim 15 wherein:
configuring the control module to determine when the system operates in the test state and the operational state comprises configuring the control module to operate the detection sensor array in the test state and the operational state multiple times;
when the detection sensor array is in the test state during a first loop of the multiple times, the detection sensor array is configured such that all of the multiple detection sensors operate in the enabled state and the control module is configured to determine for each detection sensor of the multiple detection sensors: (a) whether such detection sensor is a first detecting detection sensor that detects at least the predetermined amount of electromagnetic radiation or (b) whether such detection sensor is a first non-detecting detection sensor that detects less than the predetermined amount of electromagnetic radiation;
for the first loop of the multiple times, first detecting detection sensors of the multiple detection sensors comprise the detecting detection sensors and first non-detecting detection sensors of the multiple detection sensors comprise the non-detecting detection sensors;
when the detection sensor array is in the operational state during the first loop of the multiple times, and after the detection sensor array is in the test state during the first loop of the multiple times, the detection sensor array is configured such that the first detecting detection sensors operate in the enabled state and the first non-detecting detection sensors operate in the disabled state;

when the detection sensor array is in the test state during a second loop of the multiple times, the detection sensor array is configured such that all of the multiple detection sensors operate in the enabled state and the control module is configured to determine for each detection sensor of the multiple detection sensors: (a) whether such detection sensor is a second detecting detection sensor that detects at least the predetermined amount of electromagnetic radiation or (b) whether such detection sensor is a second non-detecting detection sensor that detects less than the predetermined amount of electromagnetic radiation;
for the second loop of the multiple times, second detecting detection sensors of the multiple detection sensors comprise the detecting detection sensors and second non-detecting detection sensors of the multiple detection sensors comprise the non-detecting detection sensors; and
when the detection sensor array is in the operational state during the second loop of the multiple times, and after the detection sensor array is in the test state during the second loop of the multiple times, the detection sensor array is configured such that the second detecting detection sensors operate in the enabled state and the second non-detecting detection sensors operate in the disabled state.

17. The method of claim 16 wherein:
the first detecting detection sensors are different by at least one detection sensor of the multiple detection sensors than the second detecting detection sensors; and
the first non-detecting detection sensors are different by at least one detection sensor of the multiple detection sensors than the second non-detecting detection sensors.

18. A system comprising:
a detection sensor array comprising multiple detection sensors, each detection sensor of the multiple detection sensors comprising an enabled state and a disabled state; and
a control module configured to operate the detection sensor array;
wherein:
under the enabled state, each detection sensor of the multiple detection sensors is configured to detect and identify electromagnetic radiation;
under the disabled state, each detection sensor of the multiple detection sensors is configured not to detect and identify electromagnetic radiation;
the detection sensor array comprises a test state and an operational state;
when the detection sensor array is in the test state, the detection sensor array is configured such that all of the multiple detection sensors operate in the enabled state and the control module is configured to determine for each detection sensor of the multiple detection sensors: (a) whether such detection sensor is a detecting detection sensor that detects modulated electromagnetic radiation or (b) whether such detection sensor is a non-detecting detection sensor that does not detect modulated electromagnetic radiation; and
when the detection sensor array is in the operational state, the detection sensor array is configured such that detecting detection sensors of the multiple detection sensors operate in the enabled state and non-detecting detection sensors of the multiple detection sensors operate in the disabled state.

19. The system of claim 18 wherein:

the control module is configured to operate the detection sensor array in the test state and the operational state in a loop multiple times;

when the detection sensor array is in the test state during a first loop of the loop multiple times, the detection sensor array is configured such that all of the multiple detection sensors operate in the enabled state and the control module is configured to determine for each detection sensor of the multiple detection sensors: (a) whether such detection sensor is a first detecting detection sensor that detects modulated electromagnetic radiation or (b) whether such detection sensor is a first non-detecting detection sensor that does not detect modulated electromagnetic radiation;

for the first loop of the loop multiple times, first detecting detection sensors of the multiple detection sensors comprise the detecting detection sensors and first non-detecting detection sensors of the multiple detection sensors comprise the non-detecting detection sensors;

when the detection sensor array is in the operational state during the first loop of the loop multiple times, and after the detection sensor array is in the test state during the first loop of the loop multiple times, the detection sensor array is configured such that the first detecting detection sensors operate in the enabled state and the first non-detecting detection sensors operate in the disabled state;

when the detection sensor array is in the test state during a second loop of the loop multiple times, the detection sensor array is configured such that all of the multiple detection sensors operate in the enabled state and the control module is configured to determine for each detection sensor of the multiple detection sensors: (a) whether such detection sensor is a second detecting detection sensor that detects modulated electromagnetic radiation or (b) whether such detection sensor is a second non-detecting detection sensor that does not detect modulated electromagnetic radiation;

for the second loop of the loop multiple times, second detecting detection sensors of the multiple detection sensors comprise detecting detection sensors and the second non-detecting detection sensors of the multiple detection sensors comprise the non-detecting detection sensors; and when the detection sensor array is in the operational state during the second loop of the loop multiple times, and after the detection sensor array is in the test state during the second loop of the loop multiple times, the detection sensor array is configured such that the second detecting detection sensors operate in the enabled state and the second non-detecting detection sensors operate in the disabled state.

20. The system of claim 19 wherein at least one of:

the control module is configured to determine when the detection sensor array operates in the test state and the operational state;

the control module is further configured so that determining for each detection sensor of the multiple detection sensors whether such detection sensor is the first or the second detecting detection sensor further comprising determining for each sensor of the multiple detection sensors whether such detection sensor detects at least a predetermined amount of modulated electromagnetic radiation; or the first detecting detection sensors are different by at least one detection sensor of the multiple detection sensors than the second detecting detection sensors, and the first non-detecting detection sensors are different by at least one detection sensor of the multiple detection sensors than the second non-detecting detection sensors.

* * * * *